(12) United States Patent
Kitayama

(10) Patent No.: US 11,066,544 B2
(45) Date of Patent: Jul. 20, 2021

(54) OPTICAL RESIN COMPOSITION AND MOLDED ARTICLE

(71) Applicant: Kaneka Corporation, Osaka (JP)

(72) Inventor: Fuminobu Kitayama, Hyogo (JP)

(73) Assignee: KANEKA CORPORATION, Osaka (JP)

(*) Notice: Subject to any disclaimer, the term of this patent is extended or adjusted under 35 U.S.C. 154(b) by 498 days.

(21) Appl. No.: 15/107,941

(22) PCT Filed: Dec. 19, 2014

(86) PCT No.: PCT/JP2014/083787
§ 371 (c)(1),
(2) Date: Jun. 24, 2016

(87) PCT Pub. No.: WO2015/098775
PCT Pub. Date: Jul. 2, 2015

(65) Prior Publication Data
US 2016/0319121 A1    Nov. 3, 2016

(30) Foreign Application Priority Data

Dec. 25, 2013  (JP) .............................. JP2013-268041

(51) Int. Cl.
| | | |
|---|---|---|
| C08L 33/24 | (2006.01) | |
| C08L 101/12 | (2006.01) | |
| C08F 8/32 | (2006.01) | |
| C08F 220/54 | (2006.01) | |
| C08L 101/00 | (2006.01) | |
| C08L 35/00 | (2006.01) | |
| C08F 265/06 | (2006.01) | |
| G02B 1/04 | (2006.01) | |

(52) U.S. Cl.
CPC ............... *C08L 33/24* (2013.01); *C08F 8/32* (2013.01); *C08F 220/54* (2013.01); *C08F 265/06* (2013.01); *C08L 35/00* (2013.01); *C08L 101/00* (2013.01); *C08L 101/12* (2013.01); *G02B 1/04* (2013.01)

(58) Field of Classification Search
CPC ...................................................... C08L 33/24
See application file for complete search history.

(56) References Cited

U.S. PATENT DOCUMENTS

| | | |
|---|---|---|
| 4,373,065 A | 2/1983 | Prest, Jr. |
| 4,916,171 A | 4/1990 | Brown et al. |
| 6,201,045 B1 * | 3/2001 | Koike ..................... C08K 5/00 428/913 |
| 6,348,542 B1 | 2/2002 | Naruse et al. |
| 6,586,515 B1 | 7/2003 | Koike |
| 2005/0119389 A1 | 6/2005 | Koike |
| 2009/0306321 A1 | 12/2009 | Koike |
| 2014/0045995 A1 | 2/2014 | Shimamoto et al. |
| 2016/0297958 A1 | 10/2016 | Kitayama et al. |
| 2016/0319121 A1 | 11/2016 | Kitayama |
| 2017/0031058 A1 | 2/2017 | Kitayama et al. |

FOREIGN PATENT DOCUMENTS

| | | | |
|---|---|---|---|
| CN | 1902240 | A | 1/2007 |
| CN | 1946794 | A | 4/2007 |
| CN | 101040195 | A | 9/2007 |
| CN | 103380175 | A | 10/2013 |
| JP | S63122748 | A | 5/1988 |
| JP | 2002023363 | A | 1/2002 |
| JP | 2005023272 | A | 1/2005 |
| JP | 3648201 | B2 | 5/2005 |
| JP | 3696649 | B2 | 9/2005 |
| JP | 2006124592 | A | 5/2006 |
| JP | 2006308682 | A | 11/2006 |
| JP | 2007191706 | A | 8/2007 |
| JP | 2007254727 | A | 10/2007 |
| JP | 2008-50550 | A | 3/2008 |
| JP | 2008179778 | A | 8/2008 |
| JP | 2008276207 | | * 11/2008 |
| JP | 2008276207 | A | 11/2008 |
| JP | 2008291153 | A | 12/2008 |
| JP | 4336586 | B2 | 9/2009 |
| JP | 2009199044 | | * 9/2009 |
| JP | 2009199044 | A | 9/2009 |
| JP | 2009203348 | A | 9/2009 |
| JP | 2009203434 | A | 9/2009 |
| JP | 2009203435 | A | 9/2009 |
| JP | 2009204860 | A | 9/2009 |
| JP | 2009269975 | A | 11/2009 |
| JP | 2009293021 | A | 12/2009 |

(Continued)

OTHER PUBLICATIONS

International Search Report dated Mar. 31, 2015, issued in corresponding International Application No. PCT/JP2014/083787, with English translation (5 pages).

Written Opinion of the International Searching Authority dated Mar. 31, 2015, issued in corresponding International Application No. PCT/JP2014/083787, with English translation (9 pages).

PCT International Preliminary Report on Patentability dated Jun. 28, 2016, by The International Bureau of WIPO in related International Application No. PCT/JP2014/083787, with English translation (11 pages).

(Continued)

*Primary Examiner* — Monique R Peets
(74) *Attorney, Agent, or Firm* — Osha Bergman Watanabe & Burton LLP

(57) ABSTRACT

An optical resin composition includes a thermoplastic resin and a cross-linked structure-containing polymer. A photoelastic constant of the cross-linked structure-containing polymer and a photoelastic constant of the thermoplastic resin are opposite in sign, and a molded article with a thickness of 2 mm formed from the optical resin composition has a haze of 6% or less.

13 Claims, 3 Drawing Sheets

(56) References Cited

FOREIGN PATENT DOCUMENTS

| | | |
|---|---|---|
| JP | 2010096919 A | 4/2010 |
| JP | 2010202798 A | 9/2010 |
| JP | 4624845 B2 | 2/2011 |
| JP | 2012255128 A | 12/2012 |
| JP | 5142938 B2 | 2/2013 |
| JP | 2013040325 A | 2/2013 |
| JP | 2013204025 A | 10/2013 |
| WO | 2010119730 A1 | 10/2010 |
| WO | 2012141413 A1 | 10/2012 |
| WO | 2014002491 A1 | 1/2014 |
| WO | 2014162369 A1 | 10/2014 |

OTHER PUBLICATIONS

Extended European Search Report issued in European Application No. 14873372.8; dated Jul. 28, 2017 (7 pages).
Office Action issued in Chinese Application No. 201480063896.6 dated Feb. 3, 2017 (12 pages).
International Search Report issued in International Application No. PCT/JP2014/005855 dated Feb. 24, 2015 (7 pages).
International Preliminary Report on Patentability issued in International Application No. PCT/JP2014/005855 dated May 24, 2016 (21 pages).
International Preliminary Report on Patentability issued in International Application No. PCT/JP2014/005935 dated May 31, 2016 (8 pages).
International Search Report issued in International Application No. PCT/JP2014/005935 dated Mar. 3, 2015 (5 pages).
International Preliminary Report on Patentability issued in International Application No. PCT/JP2014/005936 dated May 31, 2016 (15 pages).
International Search Report issued in International Application No. PCT/JP2014/005936 dated Mar. 3, 2015 (5 pages).
Office Action issued in U.S. Appl. No. 15/100,183 dated Feb. 27, 2017 (15 pages).
Office Action issued in U.S. Appl. No. 15/038,310, dated Jun. 14, 2018 (15 pages).
Office Action issued in U.S. Appl. No. 15/100,163, dated Jul. 30, 2018 (11 pages).
Office Action issued in Chinese Application No. 201480063589.8; dated Jul. 5, 2017 (15 pages).
Extended European Search Report issued in European Application No. 14865247.2 dated Jun. 12, 2017 (6 pages).
Z. Li, "Leather Finishing agent and finishing technology," Chemical Industry Press, p. 29, 2002 (4 pages) with partial translation.
Y. Shen, "Light chemical additives," China Light Industry Press, p. 234, 2004 (4 pages) with concise explanation of relevance.
Chinese Office Action issued in corresponding Chinese Application No. 201480063894.7; dated Oct. 9, 2018 (10 pages) with partial translation.
Office Action issued in Japanese Application No. 2015-554849, dated Aug. 27, 2019 (8 pages).

* cited by examiner

OPTICAL RESIN COMPOSITION AND MOLDED ARTICLE

TECHNICAL FIELD

One or more embodiments of the invention relates to an optical resin composition and a molded article.

BACKGROUND

Light-permeable resins are widely used as materials for forming film-, plate-, and lens-like optical members for use in various optical devices (e.g., films, substrates, prism sheets, and diffusers for use in liquid crystal display devices; lenses in lens systems for signal reading of optical disk devices; Fresnel lenses and lenticular lenses for projection screens). Such resins are generally called "optical resins" or "optical polymers".
Birefringence is one of important optical characteristics that should be taken into consideration when optical resins are used to form optical members. That is, in most cases, it is undesirable that optical resins have high birefringence. Particularly, in the above-mentioned applications (liquid crystal display devices, optical disk devices, projection screens, etc.), the presence of a birefringent film, sheet or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Meanwhile, as is well known in the art, birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

That is, orientation birefringence generally develops when main chains of a chain-like polymer (polymer chains) are oriented, and this orientation of main chains occurs in a process involving the flowing of a material, such as an extrusion-molding or stretching process during production of a polymer film or an injection molding process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

On the other hand, photoelastic birefringence is caused by elastic deformation (distortion) of a polymer. In the case of an optical member using a polymer, elastic deformation (distortion) occurs and remains in its material due to, for example, volume contraction caused by cooling to a temperature around the glass transition temperature of the polymer or lower, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient γ of Δσ when a birefringence difference Δn is caused by a stress difference Δσ.

$$\Delta n = \gamma \Delta \sigma$$

Hereinafter, the phrase "photoelastic birefringence is positive" means that a refractive index is large in a direction parallel to a direction in which tensile stress is applied, and the phrase "photoelastic birefringence is negative" means that a refractive index is large in a direction orthogonal to a direction in which tensile stress is applied.

Various methods for suppressing such birefringence have been studied.

For example, Patent Literature 1 discloses a non-birefringent optical resin material obtained by blending two polymer resins that are opposite in the sign of orientation birefringence to each other and are completely miscible. However, it is difficult to uniformly mix the two polymer resins described in Patent Literature 1 to obtain a practical polymer resin that uniformly exhibits low orientation birefringence as a whole, and aggregates of the polymer resins may cause defects caused by foreign matter. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence. Further, the mechanical strength, especially impact resistance, of the optical resin material is not always sufficient, which causes cracking when the optical resin material is practically used. In particular, there is also no description about transparency and color tone of the optical resin material when applied to a thick molded article such as an injection-molded article, and poor transparency and poor color tone are assumed.

Patent Literature 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5000 or less, and a resulting molded article has excellent transparency. However, there is no description about improvement in photoelastic birefringence or mechanical strength such as impact resistance. Further, there is a case where heat resistance is reduced. In particular, there is also no description about transparency and color tone of the optical resin material when applied to a thick molded article such as an injection-molded article, and poor transparency and poor color tone are assumed.

Patent literature 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength such as impact resistance. In particular, there is also no description about transparency and color tone of the optical resin material when applied to a thick molded article such as an injection-molded article, etc. and poor transparency and poor color tone are assumed.

Patent literature 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, the composition of the optical resin material is limited to some extent to make it possible to cancel out both orientation birefringence and photoelastic birefringence at the same time, and therefore the glass transition temperature of the optical resin material is as low as less than 100° C. and there is a reduction in mechanical strength including impact resistance. Further, in the case of assuming precision injection molding such as thin molding or complex shape molding, it is also assumed that polymer decomposition may occur under severe molding conditions such as high temperature and high shear. In particular, since the thermal stability of the polymer is low, occurrence of appearance defects such as foaming due to the polymer decomposition even during injection molding, as well as reduction in transparency, color tone, and mechanical strength such as impact resistance are assumed.

Patent Literature 5 discloses a method for obtaining a resin composition, which has high heat resistance and exhibits excellent mechanical strength, especially bending resistance, when formed into a polymer film, and an optical film. The resin composition is obtained by using, in combination, an acrylic resin having a glass transition temperature of 120° C. or higher and a graft copolymer obtained by graft copolymerization of an acrylic rubber-like polymer and a vinyl group polymerizable monomer ("core-shell"-type impact resistance improver, hereinafter also referred to as "core-shell polymer"). However, the data of orientation birefringence and photoelastic birefringence of Examples is not shown, and therefore it is unclear whether the graft copolymer is effective at improving birefringence. Particularly, there is no description about improvement in photoelastic birefringence in the specification. Patent Literature 5 states that the graft copolymer is added to improve mechanical strength. However, there is no description about the influence of the graft copolymer on birefringence and there is no description about the orientation birefringence and photoelastic birefringence of Examples, from which it is apparent that Patent Literature 5 has no technical idea that the graft copolymer is used to adjust birefringence. In addition, since there is no description about transparency, color tone, and mechanical strength such as impact resistance of the graft copolymer when applied to a thick molded article such as an injection-molded article, a reduction in transparency, color tone, and impact resistance is assumed.

Patent Literature 6 discloses an optical film obtained by molding a resin composition containing an acrylic resin (A) and an acrylic rubber (B). The acrylic resin (A) is a heat-resistant acrylic resin (A-1) containing a repeating unit derived from a methacrylate monomer, a repeating unit derived from a vinyl aromatic monomer, a repeating unit derived from a methacrylate monomer having an aromatic group, and a cyclic acid anhydride repeating unit. This literature states that the optical film has high heat resistance and excellent trimming property and has excellent optical characteristics even when stretched. Although there is a description about improvement in trimming property, there is no description about the mechanical strength of the thin film other than trimming property, such as cracking resistance on bending of the film and impact resistance related to a thick molded article such as an injection-molded article, and therefore it is unclear from this literature whether the mechanical strength of the optical film is at such a level that the optical film can be practically used without any problem. Further, optical films of Examples stretched 100% (twice) have high birefringence (orientation birefringence), and none of the optical films of Examples is low in both orientation birefringence and photoelastic constant (photoelastic birefringence), and therefore improvement in birefringence is not sufficiently achieved. Further, as shown in Examples, the acrylic rubber (B) described in this literature is a so-called graft copolymer (core-shell polymer), and this literature states that the acrylic rubber (B) is added to improve mechanical strength while maintaining transparency such as haze, but the influence of the acrylic rubber (B) on birefringence is not taken into consideration at all. For example, when a comparison is made between Examples and Comparative Examples, the orientation birefringences of the optical films of Examples to which the acrylic rubber (B) is added are adversely higher than those of optical films of Comparative Examples using only the acrylic resin (A), and the photoelastic constants (photoelastic birefringences) of the optical films of Examples are equal to those of the optical films of Comparative Examples using only the acrylic resin (A). Further, the heat-resistant acrylic resin has a negative photoelastic constant, and the acrylic rubber (B) is also estimated to have a negative photoelastic constant from the composition thereof, from which it is apparent that the acrylic rubber (B) deteriorates orientation birefringence and photoelastic birefringence, that is, this literature has no technical idea that the acrylic rubber (B) is used to adjust orientation birefringence and photoelastic birefringence. In addition, there is also no description about transparency and color tone when applied to a thick molded article such as an injection-molded article, a reduction in transparency and color tone is assumed.

CITATION LIST

Patent Literatures

PTL 1: U.S. Pat. No. 4,373,065
PTL 2: Japanese Patent No. 3696649
PTL 3: Japanese Patent NO. 3648201
PTL 4: Japanese Patent No. 4624845
PTL 5: JP-A-2009-203348
PTL 6: Japanese Patent No. 5142938

SUMMARY OF INVENTION

One or more embodiments of the present invention provide an optical resin composition having excellent transparency and excellent heat resistance or mechanical characteristics such as impact resistance including Izod strength, as well as being extremely low in both orientation birefringence and photoelastic birefringence even in a thick molded article such as an injection-molded article; and a molded article of the optical resin composition, particularly an injection-molded article.

The present inventor has found that the above features can be achieved by blending a crosslinked structure-containing polymer having a specific structure and composition into a thermoplastic resin.

That is, one or more embodiments of the present invention relate to:

[1] an optical resin composition comprising a thermoplastic resin and a crosslinked structure-containing polymer, wherein a photoelastic constant of the cross-linked structure-containing polymer and a photoelastic constant of the thermoplastic resin are opposite in sign, and a molded article with a thickness of 2 mm has a haze of 6% or less;

[2] the optical resin composition according to [1], wherein the cross-linked structure-containing polymer has a portion made of a hard polymer;

[3] the optical resin composition according to any one of [1] and [2], wherein the cross-linked structure-containing polymer has a cross-linked polymer containing as a structural unit a vinyl-based monomer having an alicyclic structure, a heterocyclic structure, or an aromatic group in the cross-linked structure;

[4] the optical resin composition according to any one of [1] to [3], wherein the cross-linked structure-containing polymer has a cross-linked polymer containing as a structural unit a monomer represented by the following general formula (4) in the cross-linked structure:

[Chemical Formula 1]

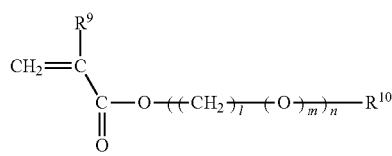

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10;

[5] the optical resin composition according to any one of [1] to [4], wherein the cross-linked structure-containing polymer has a hard polymer containing as a structural unit a vinyl-based monomer having an alicyclic structure, a heterocyclic structure, or an aromatic group;

[6] the optical resin composition according to any one of [1] to [5], wherein the cross-linked structure-containing polymer has a hard polymer containing as a structural unit the monomer represented by the above general formula (4);

[7] the optical resin composition according to any one of claims [1] to [6], wherein an orientation birefringence of the thermoplastic resin and an orientation birefringence of the cross-linked structure-containing polymer are opposite in sign;

[8] an optical resin composition comprising a thermoplastic resin and a multistep polymer, wherein the multistep polymer is a multistep polymer obtained by polymerizing a monomer mixture containing a monomer represented by the following general formula (4) and another monofunctional monomer copolymerizable therewith in the presence of cross-linked polymer-containing particles, and wherein a molded article with a thickness of 2 mm has a haze of 6% or less:

[Chemical Formula 2]

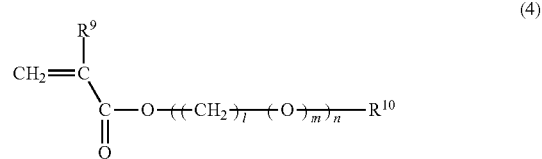

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10;

[9] the optical resin composition according to [8], wherein the cross-linked polymer-containing particles have a cross-linked polymer formed by polymerizing a monomer mixture containing a monomer represented by the following general formula (4) and a polyfunctional monomer:

[Chemical Formula 3]

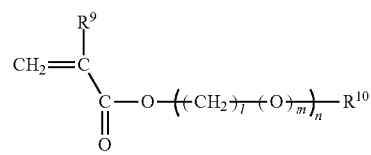

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10;

[10] an optical resin composition comprising a thermoplastic resin and a multi-layered polymer, wherein the multi-layered polymer has a cross-linked polymer layer and a layer obtained by polymerizing a monomer mixture containing a monomer represented by the following general formula (4) and another monofunctional monomer copolymerizable therewith, and wherein a molded article with a thickness of 2 mm has a haze of 6% or less:

[Chemical Formula 4]

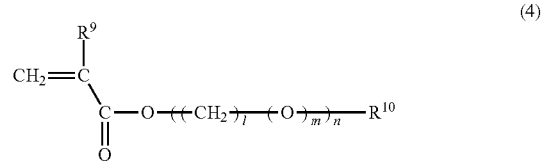

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10;

[11] the optical resin composition according to [10], wherein the cross-linked polymer layer is a cross-linked polymer layer formed by polymerizing a monomer mixture containing a monomer represented by the following general formula (4) and a polyfunctional monomer:

[Chemical Formula 5]

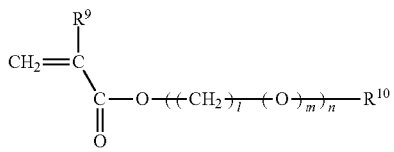

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10;

[12] the optical resin composition according to any one of [4] and [8] to [11], wherein the monomer represented by the general formula (4) is at least one selected from the group consisting of benzyl(meth)acrylate, dicyclopentanyl(meth)acrylate, and phenoxyethyl(meth)acrylate;

[13] the optical resin composition according to any one of [8] to [12], wherein a photoelastic constant of the thermoplastic resin and a photoelastic constant of the multistep polymer or the multi-layered polymer are opposite in sign;

[14] the optical resin composition according to any one of [8] to [13], wherein an orientation birefringence of the thermoplastic resin and an orientation birefringence of the multistep polymer or the multi-layered polymer are opposite in sign;

[15] the optical resin composition according to any one of [1] to [14], wherein the thermoplastic resin is an acrylic thermoplastic resin;

[16] the optical resin composition according to any one of [1] to [15], wherein the thermoplastic resin contains at least one selected from the group consisting of a maleimide acrylic resin, a glutarimide acrylic resin, a lactone ring-containing acrylic polymer, a partially hydrogenated styrene-based polymer obtained by partially hydrogenating an aromatic ring of a styrene-based polymer obtained by polymerizing a styrene monomer and another monomer copolymerizable therewith, an acrylic polymer containing a cyclic acid anhydride repeating unit, and an acrylic polymer containing a hydroxyl group and/or carboxyl group;

[17] the optical resin composition according to any one of [1] to [16], wherein the thermoplastic resin contains a maleimide acrylic resin having a maleimide unit represented by the following general formula (5) and a (meth)acrylic ester unit:

[Chemical Formula 6]

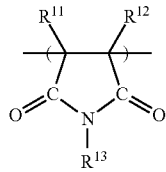

(5)

wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following Group A:

Group A: a halogen atom, a hydroxyl group, a nitro group, an alkoxy group having 1 to 12 carbon atoms, an alkyl group having 1 to 12 carbon atoms, and an arylalkyl group having 7 to 14 carbon atoms;

[18] the optical resin composition according to [17], wherein the maleimide acrylic resin further contains a unit represented by the following general formula (3):

[Chemical Formula 7]

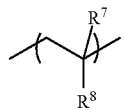

(3)

wherein $R^7$ is hydrogen or an alkyl group having 1 to 8 carbon atoms, and $R^8$ is an aryl group having 6 to 10 carbon atoms;

[19] the optical resin composition according to any one of [1] to [18], wherein the thermoplastic resin contains a glutarimide acrylic resin having a unit represented by the following general formula (1):

[Chemical Formula 8]

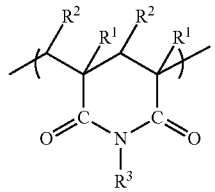

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and a unit represented by the following general formula (2):

[Chemical Formula 9]

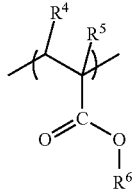

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms;

[20] the optical resin composition according to any one of [1] to [19], wherein a content of the cross-linked structure contained in the cross-linked structure-containing polymer, a content of the cross-linked polymer-containing particles contained in the multistep polymer, or a content of the cross-linked polymer layer contained in the multi-layered polymer is 1 to 60 parts by weight per 100 parts by weight of the optical resin composition;

[21] a molded article made of the optical resin composition according to any one of [1] to [20]; and

[22] an injection-molded article made of the optical resin composition according to any one of [1] to [20].

According to one or more embodiments of the present invention, there is provided an optical resin composition having excellent transparency and excellent mechanical characteristics such as impact resistance including Izod strength, as well as being extremely low in both orientation birefringence and photoelastic birefringence even in a thick molded article such as an injection-molded article; and a molded article made of the optical resin composition, particularly an injection-molded article.

DESCRIPTION OF EMBODIMENTS

Figure 1:
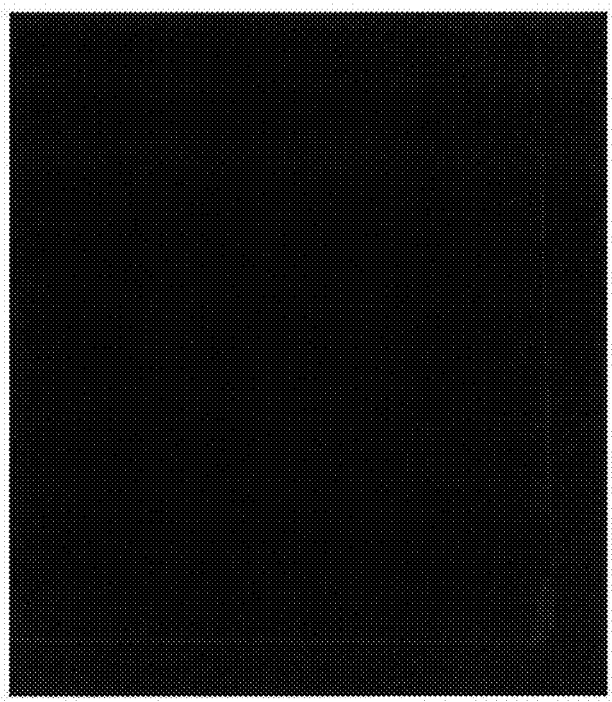
FIG. 1 is a photograph showing the result of a crossed Nicols test of the flat plate sample obtained in Example 1.
Figure 2:
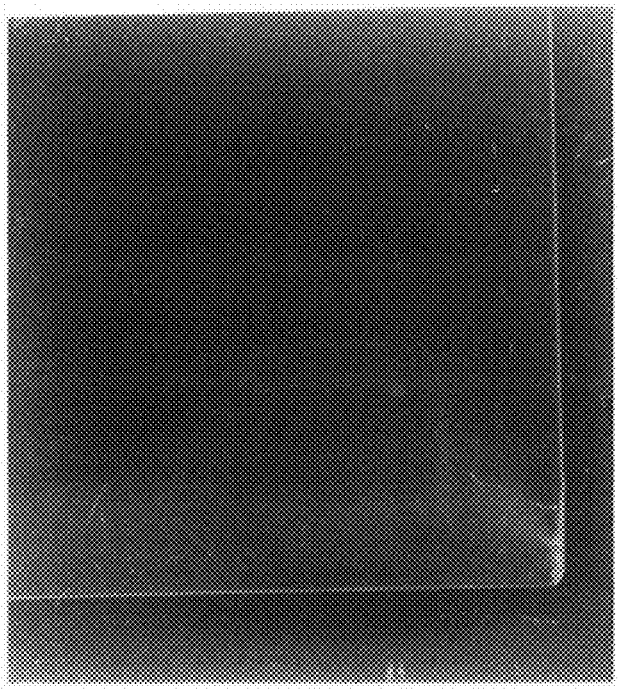
FIG. 2 is a photograph showing the result of a crossed Nicols test of the flat plate sample obtained in Example 2.
Figure 3:
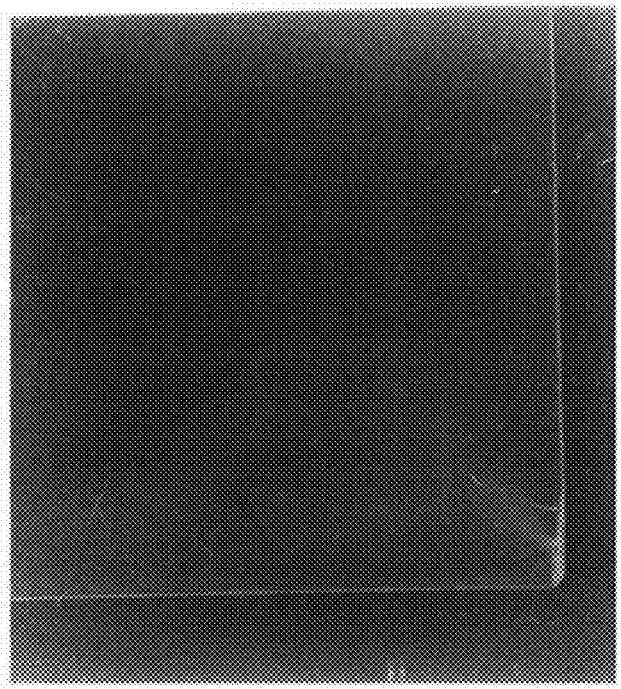
FIG. 3 is a photograph showing the result of a crossed Nicols test of the flat plate sample obtained in Comparative Example 1.
Figure 4:
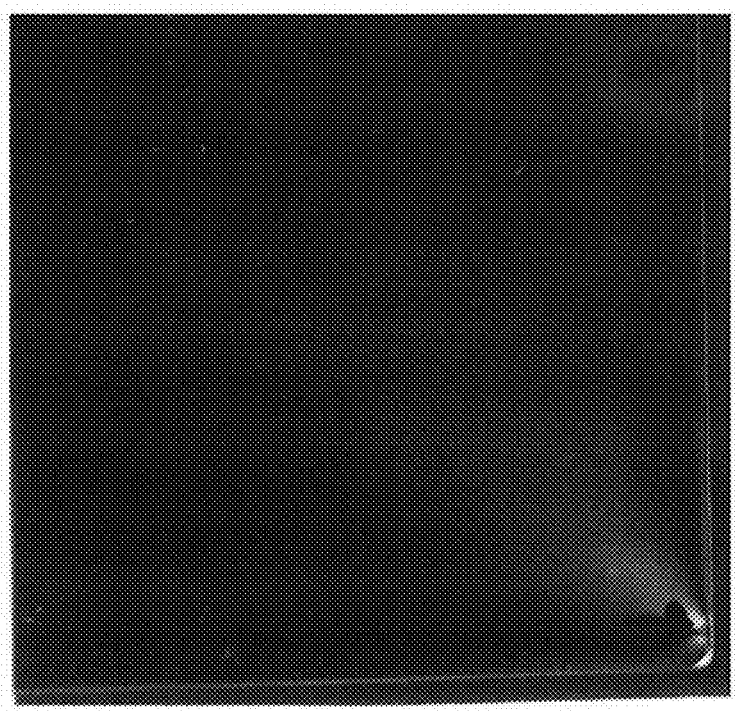
FIG. 4 is a photograph showing the result of a crossed Nicols test of the flat plate sample obtained in Comparative Example 2.
Figure 5:
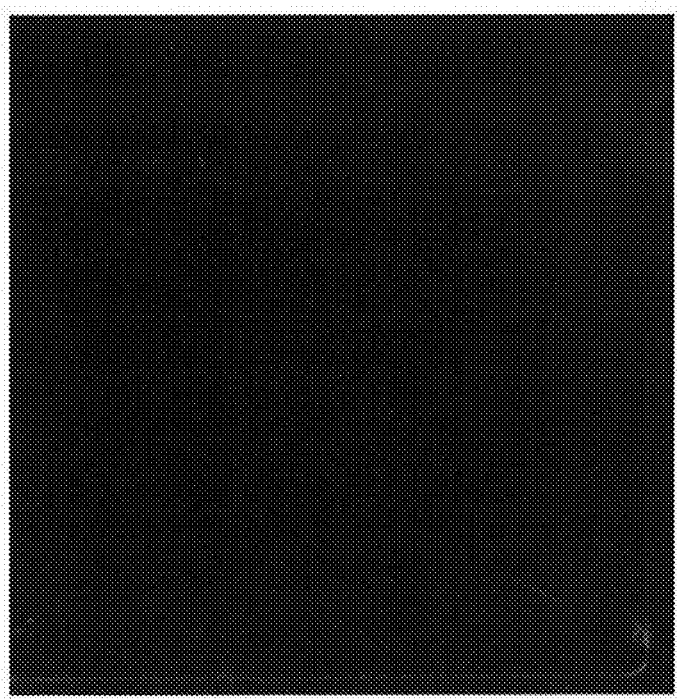
FIG. 5 is a photograph showing the result of a crossed Nicols test of the flat plate sample obtained in Comparative Example 3.

Hereinbelow, embodiments of the present invention will be described in detail, but the present invention is not limited to these embodiments.

An optical resin composition according to one or more embodiments of the present invention and a molded article thereof contain, as essential components, a thermoplastic resin that serves as a matrix resin and a cross-linked structure-containing polymer that serves as a rubber component.

(Thermoplastic Resin)

In one or more embodiments of the present invention, a resin generally having transparency can be used as the thermoplastic resin. Specific examples of the thermoplastic resin include a wide variety of transparent thermoplastic resins such as polycarbonate resins typified by bisphenol A polycarbonate; aromatic vinyl-based resins and hydrogenated products thereof such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as polymethylmethacrylate and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase such as polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins such as triacetylcellulose resins; and polyphenylene oxide resins. In consideration of practical use, the resin is preferably selected such that a resulting molded article has a total light transmittance of 85% or higher, preferably 90%, more preferably 92% or higher.

Among these resins, acrylic resins are particularly preferred for their excellent optical characteristics, heat resistance, and molding processability. Any acrylic resin may be used as long as it is a resin obtained by polymerization of a vinyl-based monomer containing (meth)acrylic ester, but an acrylic resin obtained by polymerization of 30 to 100 wt % of methyl methacrylate and 70 to 0 wt % of a monomer copolymerizable therewith is more preferred.

A preferred example of another vinyl-based monomer copolymerizable with methyl methacrylate is(meth)acrylic ester (except for methyl methacrylate) whose alkyl residue has 1 to 10 carbon atoms. Specific examples of such another vinyl-based monomer copolymerizable with methyl methacrylate include: methacrylic esters such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylic esters such as methyl acrylate, ethyl acrylate, butyl acrylate, 2-ethylhexyl acrylate, glycidyl acrylate, epoxycyclohexylmethyl acrylate, 2-hydroxyethyl acrylate, 2-hydroxypropyl acrylate; carboxylic acids such as methacrylic acid and acrylic acid and esters thereof; vinyl cyanides such as acrylonitrile and methacrylonitrile; vinyl arenes such as styrene, α-methyl styrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl-based monomers may be used singly or in combination of two or more of them.

The methyl methacrylate polymer contains methyl methacrylate in an amount of preferably 30 to 100 wt %, more preferably 50 to 99.9 wt %, even more preferably 50 to 98 wt %, and contains a monomer copolymerizable with methyl methacrylate in an amount of preferably 70 to 0 wt %, more preferably 50 to 0.1 wt %, even more preferably 50 to 2 wt %. If the methyl methacrylate content is less than 30 wt %, optical characteristics, appearance, weather resistance, and heat resistance specific to acrylic resins tend to be degraded. From the viewpoint of processability and appearance, it is preferred that a polyfunctional monomer is not used.

The glass transition temperature of the thermoplastic resin used in one or more embodiments of the present invention can be set according to use conditions and intended use. The glass transition temperature is preferably 100° C. or higher, more preferably 110° C. or higher, even more preferably 115° C. or higher, most preferably 120° C. or higher.

A specific example of an acrylic resin having a glass transition temperature of 120° C. or higher includes an acrylic resin containing a maleimide structure, a glutarimide structure, a glutaric anhydride structure, a (meth)acrylic acid unit, or a lactone ring in its molecule. Examples of such an acrylic resin include maleimide acrylic resins, glutarimide acrylic resins, glutaric anhydride acrylic resins, lactone ring-containing acrylic resins, hydroxyl group- and/or carboxyl group-containing acrylic resins, and methacrylic resins. Examples of another usable resin having a glass transition temperature of 120° C. or higher include partially-hydrogenated styrene-based polymers obtained by partial hydrogenation of aromatic rings of a styrene-based polymer obtained by polymerization of a styrene monomer and another monomer copolymerizable therewith, polymers containing a cyclic acid anhydride repeating unit, polyethylene terephthalate resins, and polybutylene terephthalate resins. Among them, a maleimide acrylic resin and/or a glutarimide acrylic resin that will be described below are/is particularly preferably used because a resulting film, sheet, molded article such as an injection-molded article has improved heat resistance and also has excellent optical characteristics in the presence of the orientation or residual strain due to stretching or injection molding. Particularly, a maleimide acrylic resin and a glutarimide acrylic resin are preferably used in combination as the thermoplastic resin. Both the resins are highly miscible, and therefore when they are used in combination, their excellent transparency can be maintained, both low orientation birefringence and low photoelastic birefringence are achieved, and high heat stability and high solvent resistance can also be maintained.

(Maleimide Acrylic Resin)

Specifically, the maleimide acrylic resin is a copolymer having a maleimide unit represented by the following general formula (5) and a (meth)acrylic ester unit.

[Chemical Formula 10]

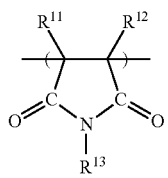

(5)

In the above general formula (5), $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A.

Group A: a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

<$R^{11}$ and $R^{12}$>

The alkyl group having 1 to 12 carbon atoms as $R^{11}$ and $R^{12}$ is preferably an alkyl group having 1 to 6 carbon atoms, more preferably an alkyl group having 1 to 4 carbon atoms. Examples of the alkyl group having 1 to 12 carbon atoms as $R^{11}$ and $R^{12}$ include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the aryl group having 6 to 14 carbon atoms as $R^{11}$ and $R^{12}$ include a phenyl group, a naphthyl group, and an anthracenyl group. Among them, from the viewpoint of further improving heat resistance and optical characteristics such as low birefringence, a phenyl group is preferred.

$R^{11}$ and $R^{12}$ are preferably a hydrogen atom, an alkyl group having 1 to 4 carbon atoms, or a phenyl group, more preferably a hydrogen atom.

<$R^{13}$>

Examples of the arylalkyl group having 7 to 14 carbon atoms as $R^{13}$ include a benzyl group, a 1-phenylethyl group, a 2-phenylethyl group, a 3-phenylpropyl group, a 6-phenylhexyl group, and an 8-phenyloctyl group. Among them, from the viewpoint of further improving heat resistance and optical characteristics such as low birefringence, a benzyl group is preferred.

Examples of the aryl group having 6 to 14 carbon atoms as $R^{13}$ include a phenyl group, a naphthyl group, and an anthracenyl group. Among them, from the viewpoint of further improving heat resistance and optical characteristics such as low birefringence, a phenyl group is preferred.

$R^{13}$ may be an aryl group having 6 to 14 carbon atoms and a substituent group. Here, the substituent group is selected from the group (Group A) consisting of a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms as the substituent group include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the arylalkyl group having 7 to 14 carbon atoms as the substituent group include a benzyl group, a 1-phenylethyl group, a 2-phenylethyl group, a 3-phenylpropyl group, a 6-phenylhexyl group, and an 8-phenyloctyl group. Among them, a benzyl group, a 1-phenylethyl group, a 2-phenylethyl group, and a 3-phenylpropyl group are preferred.

The aryl group having 6 to 14 carbon atoms and a substituent group as $R^{13}$ is preferably a phenyl group having a substituent group or a naphthyl group having a substituent group. Examples of the aryl group having 6 to 14 carbon atoms and a substituent include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group, and a 2,4,6-trimethylphenyl group. Among them, from the viewpoint of imparting flame retardancy, a 2,4,6-tribromophenyl group is preferred.

Examples of the cycloalkyl group having 3 to 12 carbon atoms as $R^{13}$ include a cyclopropyl group, a cyclobutyl group, a cyclopentyl group, a cyclohexyl group, a cycloheptyl group, a cyclooctyl group, a tricyclodecyl group, a bicyclooctyl group, a tricyclododecyl group, an isobornyl group, an adamantyl group, and a tetracyclododecyl group. Among them, a cyclopropyl group, a cyclobutyl group, a cyclopentyl group, a cyclohexyl group, a cycloheptyl group, and a cyclooctyl group are preferred, and from the viewpoint of further improving weather resistance and optical characteristics such as transparency and imparting low water absorbability, a cyclohexyl group is more preferred.

The alkyl group having 1 to 18 carbon atoms as $R^{13}$ is preferably an alkyl group having 1 to 10 carbon atoms, more preferably an alkyl group having 1 to 8 carbon atoms. Examples of the alkyl group having 1 to 18 carbon atoms as $R^{13}$ include a methyl group, an ethyl group, a n-propyl group, an isopropyl group, a n-butyl group, an isobutyl group, a t-butyl group, a n-pentyl group, a n-hexyl group, a n-octyl group, a n-dodecyl group, a n-octadecyl group, a 2-ethylhexyl group, a 1-decyl group, and a 1-dodecyl group. Among them, from the viewpoint of further improving weather resistance and optical characteristics such as transparency, a methyl group, an ethyl group, and an isopropyl group are preferred.

$R^{13}$ may be an alkyl group having 1 to 12 carbon atoms and a substituent group. Here, the substituent group is selected from the group (group A) consisting of a halogen atom, a hydroxyl group, a nitro group, and an alkoxy group having 1 to 12 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms and a substituent group as $R^{13}$ include a dichloromethyl group, a trichloromethyl group, a trifluoroethyl group, and a hydroxyethyl group. Among them, a trifluoroethyl group is preferred.

Specific examples of the maleimide unit represented by the general formula (5) include an unsubstituted maleimide unit, an N-methylmaleimide unit, an N-phenylmaleimide unit, an N-cyclohexylmaleimide unit, and an N-benzylmaleimide unit.

Only one kind of maleimide unit may be used, or two or more kinds of maleimide units may be used in combination.

The maleimide unit content of the maleimide acrylic resin is not particularly limited, and can be appropriately determined in consideration of, for example, the structure of $R^{13}$. However, the maleimide unit content is preferably 1.0 wt % or more, more preferably 1 wt % to 99 wt %, even more preferably 1 wt % to 80 wt % with respect to the total weight of the maleimide acrylic resin. If the maleimide unit content is not within the above range, optical isotropy tends to be poor.

The (meth)acrylic ester unit that the maleimide acrylic resin has may be the same as a unit represented by a general formula (2) that will be described later with reference to the glutarimide acrylic resin. Only one kind of (meth)acrylic ester unit may be used, or two or more kinds of (meth)acrylic ester units may be used in combination.

The maleimide acrylic resin preferably further has a unit represented by the following general formula (3) to adjust optical characteristics:

[Chemical Formula 11]

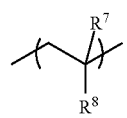

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The maleimide acrylic resin may contain only one kind of unit represented by the above general formula (3) or may contain two or more kinds of units represented by the above general formula (3) between which one of $R^7$ and $R^8$ is different or both of them are different.

The content of the unit represented by the general formula (3) contained in the maleimide acrylic resin is not particularly limited, but is preferably 0 to 40 wt %, more preferably 0 to 20 wt %, particularly preferably 0 to 15 wt % with respect to the total weight of the maleimide acrylic resin.

If necessary, the maleimide acrylic resin may further contain another unit other than the units described above.

The weight-average molecular weight of the maleimide acrylic resin is not particularly limited, but is preferably in the range of $1\times10^4$ to $5\times10^5$. By setting the weight-average molecular weight of the maleimide acrylic resin to a value within the above range, it is possible to prevent deterioration of molding processability or to prevent a molded article from having poor mechanical strength. On the other hand, if the weight-average molecular weight is less than the above lower limit, a molded article tends to have poor mechanical strength. If the weight-average molecular weight exceeds the above upper limit, viscosity during melt extrusion or injection molding tends to be high, molding processability tends to be deteriorated, and molded article productivity tends to be reduced.

The maleimide acrylic resin can be obtained by, for example, the following polymerization step. Further, the maleimide acrylic resin can be refined by the following devolatilization step.

(Polymerization Step)

The maleimide acrylic resin can be obtained by polymerizing monomers selected from the monomers described above as its structural units.

In a polymerization reaction to obtain the maleimide acrylic resin according to this embodiment, monomers whose reactivities are close to each other and/or monomers whose copolymerizabilities are high are preferably combined because the compositional ratio of a resulting maleimide acrylic resin can be easily controlled based on the compositional ratio of raw materials charged into a reaction liquid. On the other hand, if monomers whose reactivities are significantly different are combined, features may occur such as a) that a monomer having low reactivity does not sufficiently react and remains as an unreacted monomer and b) that the compositional ratio of a resulting maleimide acrylic resin is difficult to be predicted. Particularly, if the unreacted monomer remains, there is also a feature that the characteristics of the maleimide acrylic resin, such as transparency and light resistance, are deteriorated.

Examples of a polymerization method that can be used to obtain the maleimide acrylic resin include common polymerization methods such as cast polymerization, bulk polymerization, suspension polymerization, solution polymerization, emulsion polymerization, living radical polymerization, and anion polymerization. In order to use the maleimide acrylic resin as an optical material, mixing of minute foreign matter into the maleimide acrylic resin is preferably avoided as much as possible. From such a viewpoint, cast polymerization, solution polymerization, or suspension polymerization is preferably used, and cast polymerization or solution polymerization not using a suspension agent or an emulsifying agent is more preferably used.

A polymerization mode may be, for example, either batch polymerization or continuous polymerization. From the viewpoint of simple polymerization operation, batch polymerization is preferred, and from the viewpoint of obtaining a polymer more uniform in composition, continuous polymerization is preferred.

The temperature and time of the polymerization reaction can be appropriately adjusted depending on the types of monomers used or the ratio between monomers used. For example, the polymerization temperature is 0 to 150° C. and the polymerization time is 0.5 to 24 hours, and preferably, the polymerization temperature is 40 to 150° C. and the polymerization time is 1 to 15 hours.

In a radical polymerization reaction, a polymerization initiator may be added, if necessary. As the polymerization initiator, any initiator commonly used in radical polymerization can be used. Examples of such an initiator include: organic peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethyl hexanoate, and lauroyl peroxide; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used singly or in combination of two or more of them.

The amount of the polymerization initiator to be used is not particularly limited and may be appropriately set depending on the combination of monomers or reaction conditions, but is preferably in the range of 0.005 to 5 mass %.

A molecular weight modifier used in the polymerization reaction, if necessary, is any molecular weight modifier commonly used in radical polymerization. Particularly preferred examples of such a molecular weight modifier include mercaptan compounds such as butyl mercaptan, octyl mercaptan, dodecyl mercaptan, and 2-ethylhexyl thioglycolate. Such a molecular weight modifier is added at a concentration within such a range that the molecular weight is controlled to be within the above range.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used singly or in combination of two or more of them. If the boiling point of the solvent used is too high, the finally-obtained maleimide acrylic resin has a high residual volatile matter content. For this reason, a solvent having a boiling point of 50 to 200° C. is preferred.

In the polymerization reaction, an organic phosphorus compound or an organic acid may be added, if necessary. When these compounds coexist, there may be case where a side reaction is suppressed and/or the amount of unreacted N-substituted maleimide is reduced so that coloring of a resulting maleimide acrylic resin during molding processing is reduced.

Examples of the organic phosphorus compound include: alkyl(aryl)phosphonous acid and diesters or monoesters thereof; dialkyl(aryl)phosphine acid and esters thereof; alkyl (aryl)phosphonic acid and diesters or monoesters thereof; alkyl phosphonous acid and esters thereof; phosphorous acid diesters, phosphorous acid monoesters, and phosphorous acid triesters; phosphoric diesters, phosphoric monoesters, and phosphoric triesters. These organic phosphorus compounds may be used singly or in combination of two or more of them. The amount of the organic phosphorus compound to be used is preferably 0.001 to 5.0 mass % with respect to the total mass of monomers.

Examples of the organic acid include acetic acid, propionic acid, butyric acid, valeric acid, caproic acid, caprylic acid, capric acid, lauric acid, stearic acid, oleic acid, linoleic acid, linolenic acid, benzoic acid, cyclohexanecarboxylic acid, phthalic acid, isophthalic acid, and terephthalic acid, and acid anhydrides thereof. These organic acids may be used singly or in combination of two or more of them. The amount of the organic acid to be used is preferably 0.001 to 1.0 mass % with respect to the total mass of monomers.

The polymerization reaction is preferably performed at a polymer concentration of 10 to 95 mass %, more preferably 75 mass % or less, even more preferably 60 mass % or less to achieve an appropriate viscosity of a reaction liquid from the viewpoint of removing heat during polymerization. When the polymer concentration is 10 mass % or more, the adjustment of molecular weight and molecular weight distribution is easily performed. When the polymer concentration is 95 mass % or less, a polymer having a high molecular weight can be obtained.

From the viewpoint of maintaining an appropriate viscosity of the obtained polymerization reaction liquid, a polymerization solvent can be appropriately added. By maintaining an appropriate viscosity of the reaction liquid, heat removal can be controlled and the generation of microgels in the reaction liquid can be suppressed. Particularly, in the latter half of the polymerization reaction in which the viscosity increases, it is more preferred that the polymer concentration is controlled to be 50 mass % or less by appropriately adding the polymerization solvent.

The mode of appropriately adding the polymerization solvent to the polymerization reaction liquid is not particularly limited. For example, the polymerization solvent may be added continuously or intermittently. By controlling the concentration of the maleimide acrylic resin formed in the polymerization reaction liquid in this way, the uniformity of temperature in the reactor can be improved and gelation of the reaction liquid can be more sufficiently suppressed. The polymerization solvent to be added may be, for example, the same as or different from a solvent initially charged to perform the polymerization reaction. However, a solvent that is the same as a solvent initially charged to perform the polymerization reaction is preferably used. The polymerization solvent to be added may be a single solvent of only one kind of solvent or a mixed solvent of two or more kinds of solvents.

When the maleimide acrylic resin is obtained by suspension polymerization, a suspension agent and, if necessary, an auxiliary suspension agent are added to an aqueous medium. Examples of the suspension agent include: water-soluble polymers such as polyvinyl alcohol, methyl cellulose, polyoxyethylene-polyoxypropylene block copolymer, polyethylene oxide, and polyacrylamide; and inorganic substances such as calcium phosphate and magnesium pyrophosphate. The amount of the water-soluble polymer to be used is preferably 0.01 to 2 mass % with respect to the total mass of monomers, and the amount of the inorganic substance to be used is preferably 0.01 to 2 mass % with respect to the total mass of monomers. Examples of the auxiliary suspension agent include: low-molecular weight surfactants such as anion surfactants such as sodium dodecylbenzene sulfonate, sodium lauryl sulfate, sodium alkyl naphthalene sulfonate, and sodium dialkylsulfosuccinate; and water-soluble inorganic salts such as boric acid, sodium carbonate, disodium hydrogen phosphate, sodium dihydrogen phosphate, and sodium sulfate. The auxiliary suspension agent is preferably disodium hydrogen phosphate or sodium dodecylbenzene sulfonate. When an inorganic substance is used as the suspension agent, the auxiliary suspension agent is preferably used. The auxiliary suspension agent is preferably used in an amount of 0.001 to 2 mass % per 100 mass % of monomers.

(Devolatilization Step)

The devolatilization step means a step in which volatile components such as a polymerization solvent, residual monomers, and water are removed by the application of heat under reduced pressure, if necessary. If such removal treatment is insufficient, a resulting maleimide acrylic resin has a high residual volatile matter content, and therefore the maleimide acrylic resin may be colored due to alteration or the like during molding, or molding defects such as bubbles or silver streaks may occur. The residual volatile matter content is 1 mass % or less, preferably 0.5 mass % or less, more preferably 0.4 mass % or less, even more preferably 0.3 mass % or less per 100 mass % of the maleimide acrylic resin. The residual volatile matter content corresponds to the total amount of residual monomers that have not been reacted in the above-described polymerization reaction, a polymerization solvent, and a side-reaction product.

Examples of an apparatus used in the devolatilization step include a devolatilization apparatus including a heat exchanger and a devolatilization tank; a vent-equipped extruder; and an apparatus in which a devolatilizer and an extruder are arranged in series. When a vent-equipped extruder is used, the extruder may have one vent or two or more vents, but preferably has two or more vents.

The temperature of the devolatilization step is preferably 150 to 350° C., more preferably 170 to 330° C., even more preferably 200 to 300° C. If the temperature is less than 150° C., there is a case where the maleimide acrylic resin has a high residual volatile matter content. On the other hand, if the temperature exceeds 350° C., there is a case where a resulting maleimide acrylic resin is colored or decomposed.

The pressure of the devolatilization step is preferably 931 to 1.33 hPa (700 to 1 mmHg), more preferably 800 to 13.3 hPa (600 to 10 mmHg), even more preferably 667 to 20.0 hPa (500 to 15 mmHg). If the pressure exceeds 931 hPa (700 mmHg), there is a case where volatile matter is likely to remain. On the other hand, if the pressure is less than 1.33 hPa (1 mmHg), there is a case where devolatilization is difficult to be industrially performed.

The treatment time is appropriately selected depending on the amount of residual volatile matter, but is preferably as short as possible in order to suppress the coloring or decomposition of a resulting maleimide acrylic resin.

In a case where the reaction conversion rate of monomers in the polymerization reaction is low, a large amount of unreacted monomers remains in the polymerization solution. In this case, treatment needs to be performed for a long time at a high treatment temperature to reduce the residual volatile matter content of a resulting maleimide acrylic resin. However, coloring or decomposition is likely to occur. In a case where the polymerization reaction liquid containing a large amount of unreacted monomers is treated, the monomers that cause a problem can be removed from the polymerization reaction liquid by, for example, performing pretreatment in which an aromatic hydrocarbon-based solvent, a hydrocarbon-based solvent, an alcohol-based solvent or the like is added to the polymerization solution, homogenizer (emulsion and dispersion) treatment is then performed, and liquid-liquid extraction or solid-liquid extraction of the unreacted monomers is performed. When the polymerization reaction liquid after separation of the monomers by the pretreatment is subjected to the devolatilization step, the total amount of monomers remaining in 100 mass % of a resulting thermoplastic resin can be reduced to 1 mass % or less.

(Glutarimide Acrylic Resin)

The glutarimide acrylic resin has a glass transition temperature of 120° C. or higher and contains a unit represented by the following general formula (1) and a unit represented by the following general formula (2):

[Chemical Formula 12]

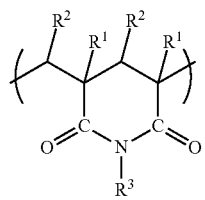
(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (1) is also referred to as a "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylic ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin. If the glutarimide unit content is less than the above lower limit, a resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a molded article, or impair transparency.

The glutarimide unit content is calculated in the following manner.

The resin is subjected to ¹H-NMR analysis using ¹H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, a glutarimide unit content (wt %) can be determined from the following calculation formula using the area a of a peak derived from protons of O—CH₃ of methyl methacrylate and appearing at about 3.5 to 3.8 ppm and the area b of a peak derived from protons of N—CH₃ of glutarimide and appearing at about 3.0 to 3.3 ppm.

[Methyl methacrylate unit content $A$(mol %)]=100× $a/(a+b)$

[Glutarimide unit content $B$(mol %)]=100× $b/(a+b)$

[Glutarimide unit content (wt %)]=100×($b$×(molecular weight of glutarimide unit))/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the optical resin composition according to one or more embodiments of the present invention is used for, for example, an optical member such as a lens, the glutarimide unit content is preferably 20 wt % or less, more preferably 15 wt % or less, even more preferably 10 wt % or less because birefringence is more likely to be suppressed.

[Chemical Formula 13]

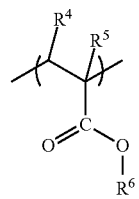
(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylic ester unit". It is to be noted that in this specification, "(meth)acryl" refers to "methacryl or acryl".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylic ester unit or two or more kinds of (meth)acrylic ester units between which any one of $R^4$, $R^5$, and $R^6$ in the above general formula (2) is different or all of them are different.

If necessary, the glutarimide acrylic resin may further contain a unit represented by the following general formula (3) (hereinafter, also referred to as "aromatic vinyl unit"):

[Chemical Formula 14]

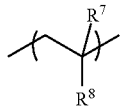

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-styrene unit. The aromatic vinyl unit is preferably a styrene unit.

The glutarimide acrylic resin may contain only one kind of aromatic vinyl unit or two or more kinds of aromatic vinyl units between which one of $R^7$ and $R^8$ is different or both of them are different.

The aromatic vinyl unit content of the glutarimide acrylic resin is not particularly limited, but is preferably 0 to 50 wt %, more preferably 0 to 20 wt %, particularly preferably 0 to 15 wt % with respect to the total weight of the glutarimide acrylic resin. If the aromatic vinyl unit content exceeds the above upper limit, the glutarimide acrylic resin cannot have sufficient heat resistance.

However, in one or more embodiments of the present invention, the glutarimide acrylic resin preferably contains no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylic ester unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexylmaleimide.

The another unit may be incorporated into the glutarimide acrylic resin by random copolymerization or graft copolymerization.

The another unit may be incorporated by copolymerization of a monomer constituting the another unit with a resin as a raw material for producing the glutarimide acrylic resin. Alternatively, the another unit incorporated into the glutarimide acrylic resin may be a by-product of the above-described imidization reaction.

The weight-average molecular weight of the glutarimide acrylic resin is not particularly limited, but is preferably in the range of $1 \times 10^4$ to $5 \times 10^5$. By setting the weight-average molecular weight of the glutarimide acrylic resin to a value within the above range, it is possible to prevent deterioration of molding processability or to prevent a molded article from having poor mechanical strength. On the other hand, if the weight-average molecular weight is less than the above lower limit, a molded article tends to have poor mechanical strength. Further, if the weight-average molecular weight exceeds the above upper limit, viscosity during melt extrusion tends to be high, molding processability tends to be deteriorated, and molded article productivity tends to be reduced.

The glass transition temperature of the glutarimide acrylic resin is preferably 120° C. or higher so that a molded article can have excellent heat resistance. More preferably, the glass transition temperature of the glutarimide acrylic resin is 125° C. or higher. If the glass transition temperature of the glutarimide acrylic resin is lower than the above lower limit, a molded article cannot have sufficient heat resistance.

Hereinbelow, one example of a method for producing the glutarimide acrylic resin will be described.

First, a (meth)acrylic ester polymer is produced by polymerization of (meth)acrylic ester. When the glutarimide acrylic resin contains an aromatic vinyl unit, a (meth)acrylic ester-aromatic vinyl copolymer is produced by copolymerization of (meth)acrylic ester and an aromatic vinyl compound.

The (meth)acrylic ester used in this step is preferably, for example, methyl(meth)acrylate, ethyl(meth)acrylate, butyl (meth)acrylate, isobutyl(meth)acrylate, t-butyl(meth)acrylate, benzyl(meth)acrylate, or cyclohexyl(meth)acrylate, and is more preferably methyl methacrylate.

These (meth)acrylic esters may be used singly or in combination of two or more of them. The use of two or more kinds of (meth)acrylic esters makes it possible to finally obtain a glutarimide acrylic resin containing two or more kinds of (meth)acrylic ester units.

The structure of the (meth)acrylic ester polymer or the (meth)acrylic ester-aromatic vinyl copolymer is not particularly limited as long as a subsequent imidization reaction can be performed. More specifically, the (meth)acrylic ester polymer or the (meth)acrylic ester-aromatic vinyl copolymer may be a linear polymer, a block polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer.

Then, the (meth)acrylic ester polymer or the (meth)acrylic ester-aromatic vinyl copolymer is reacted with an imidization agent to perform an imidization reaction. In this way, a glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can offer an excellent balance of heat resistance, mechanical properties, and molding processability. On the other hand, if the acid value exceeds the above upper limit, foaming of the resin is likely to occur during melt extrusion or injection-molding for pellet or molded article formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane)phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylic ester polymer or the (meth) acrylic ester-aromatic vinyl polymer. By setting the amount of the esterification agent to be used to a value within the above range, it is possible to adjust the acid value of the glutarimide acrylic resin to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Examples of a batch-type reactor having such a structure include a mixing vessel MAX BLEND manufactured by Sumitomo Heavy Industries, Ltd., and the like.

In such a way as described above, the glutarimide acrylic resin whose glutarimide unit content is controlled to a specific value can be easily produced.

When the maleimide acrylic resin and the glutarimide acrylic resin are used in combination, the maleimide acrylic resin content of the optical resin composition can be appropriately determined depending on desired physical properties of the optical resin composition. For example, the maleimide acrylic resin content of the optical resin composition is preferably 1 to 99 parts by weight per 100 parts by weight of the total amount of the maleimide acrylic resin and the glutarimide acrylic resin. The maleimide acrylic resin content is more preferably 1 to 80 parts by weight, even more preferably 5 to 70 parts by weight.

(Cross-Linked Structure-Containing Polymer)

The cross-linked structure-containing polymer used in one or more embodiments of the present invention is an essential component to allow the optical resin composition to have high optical isotropy, because addition of the cross-linked structure-containing polymer to the thermoplastic resin as a matrix resin makes it possible to reduce both orientation birefringence and photoelastic constant. Further, even in a thick molded article such as an injection-molded article, excellent transparency and color tone are exhibited and mechanical strength such as impact resistance is improved.

A preferred embodiment for the cross-linked structure-containing polymer includes a multistep polymer and a multi-layered polymer. The multistep polymer is a polymer obtained by polymerizing a hard monomer mixture in the presence of cross-linked polymer-containing particles, and the multi-layered polymer is a polymer having a cross-linked polymer layer and a hard polymer layer. Both the polymers are basically identical, but the former is a polymer mainly identified by a production method, and the latter is a polymer mainly identified by a layer structure. The following description will be made mainly with reference to the latter, but apply equally to the former.

In order to allow the optical resin composition to have optical isotropy, how to reduce orientation birefringence and photoelastic birefringence is important. Therefore, the concepts of "orientation birefringence" and "photoelastic birefringence" of each of the thermoplastic resin, the cross-linked structure-containing polymer, the optical resin composition, and the injection-molded article according to one or more embodiments of the present invention will be first described below.

(Concept of Orientation Birefringence)

When an injection-molded article is produced by normal injection molding, not by molding performed under such conditions that a polymer is oriented in the injection-molded article, such as thin molding, complex shape molding, and low temperature molding, a polymer is not very highly oriented in the molded article. However, even in such a normal injection-molded article, it is known that the polymer chains are easily oriented, particularly in the vicinity of gate portion. In the place where the polymer chains are easily oriented, the birefringence is generated even in an acrylic resin represented by PMMA. Such birefringence is due to polymer orientation, and is therefore generally called orientation birefringence. As described above, the orientation birefringence of a molded article obtained from the optical resin composition according to one or more embodiments of the present invention depends on how the optical resin composition according to one or more embodiments of the present invention is molded according to the molding conditions, thickness, shape, gate shape, position, the number of gates or the like. In order to reduce the orientation birefringence of such a molded article, it is important to set the orientation birefringence of the cross-linked structure-containing polymer and the orientation birefringence of the thermoplastic resin. However, as mentioned earlier, when polymer orientation hardly occurs in an injection-molded article and the birefringence is sufficiently small, the orientation birefringence of the cross-linked structure-containing polymer does not need to be greatly taken into consideration and is therefore not particularly limited when resin design is performed.

The measurement of "orientation birefringence" in the present disclosure was performed as follows.

<Orientation Birefringence of Optical Resin Composition>

An injection-molded article was prepared from the optical resin composition according to one or more embodiments of the present invention and its orientation birefringence was evaluated.

1. Orientation Birefringence in Central Portion of Injection-Molded Article

A test specimen of 15 mm×90 mm is cut out (so that the length 90 mm is in the longitudinal direction) from the central portion of a flat plate (2 mm in thickness, 15 cm×10 cm) obtained by injection-molding, and the birefringence is measured using a birefringence measurement device. This portion is a portion where a polymer is relatively hard to be oriented in one direction.

2. Orientation Birefringence of Gate Portion of Injection-Molded Article

The birefringence in the vicinity of the gate of the same flat plate as described above is evaluated. The polymer chains in this portion are very easily oriented in one direction, and it is the easiest way to see the difference in birefringence between the samples. As an evaluation method, the above-mentioned flat plate is placed in between two orthogonal polarization plates, and the crossed Nicols test is performed to confirm whether or not the transmitted light (the presence or absence of light leakage) is observed. In the case of a resin having a high orientation birefringence, such light leakage due to the orientation birefringence tends to occur.

<Orientation Birefringence of Cross-Linked Structure-Containing Polymer>

It is difficult to perform injection-molding of a cross-linked structure polymer by itself, depending on the structure and the composition. Therefore, a press-molded sheet is prepared to measure the "orientation birefringence".

The cross-linked structure-containing polymer is pressed at 190° C. to prepare a press-molded sheet having a thickness of 500 μm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained molded article is cooled to 23° C., and a sample is taken from the central portion of the film to measure birefringence and determine the sign of orientation birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values and signs obtained under the almost same measuring conditions such as stretching conditions.

(Concept of Photoelastic Birefringence (Photoelastic Constant))

As has been described above, photoelastic birefringence is birefringence caused by elastic deformation (distortion) of a polymer in a molded article when stress is applied to the molded article. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", each of the thermoplastic resin, the cross-linked structure-containing polymer, and the optical resin composition needs to be formed into a some form of molded article to measure its photoelastic birefringence. In one or more embodiments of the present invention, the molded article is defined as an injection-molded article or press-molded sheet.

<Photoelastic Constant of Optical Resin Composition>

As in the case of the above-described measuring method of the orientation birefringence, a test specimen of 15 mm×90 mm is cut out (so that the length 90 mm is in the longitudinal direction) from the central portion of a flat plate (2 mm in thickness, 15 cm×10 cm) obtained by injection molding. Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

<Photoelastic Constant of Cross-Linked Structure-Containing Polymer>

As in the case of the above-described item of the "orientation birefringence", a press-molded sheet is prepared from the cross-linked structure-containing polymer and the photoelastic constant is determined by measuring the birefringence of the sheet. The cross-linked structure-containing polymer is pressed at 190° C. to prepare a press-molded sheet having a thickness of 500 μm, and a test specimen of 25 mm×90 mm is cut out from the central portion of the obtained press-molded sheet. The measurement conditions and calculation method are the same as those in the case of the injection-molded article as described above.

The photoelastic birefringence of a polymer is a property intrinsic to the structure of the polymer, and therefore when the photoelastic constant of the thermoplastic resin is large, the photoelastic constant of the cross-linked structure-containing polymer needs to be opposite in sign to the photoelastic constant of the thermoplastic resin. Further, the cross-linked structure-containing polymer needs to be added in such an amount that the photoelastic birefringence of the thermoplastic resin can be cancelled out. It is known that additivity is established between the photoelastic constant of a resulting polymer (copolymer) and the photoelastic constants of homopolymers corresponding to monomer species used for copolymerization. Therefore, when the photoelastic constant of the cross-linked structure-containing polymer is opposite in sign to the photoelastic constant of the thermoplastic resin and is larger, the amount of the cross-linked structure-containing polymer that needs to be added to reduce the photoelastic birefringence of the optical resin composition composed of the thermoplastic resin and the cross-linked structure-containing polymer and the photoelastic birefringence of the molded article thereof can be made smaller. Furthermore, by using two kinds of thermoplastic resins whose photoelastic birefringences are opposite in sign, it is possible to reduce the photoelastic constant of the thermoplastic resin alloy, so that the amount of the cross-linked structure-containing polymer required for reducing the photoelastic birefringence can be made further small.

As for orientation birefringence, as described above, when the degree of polymer orientation in a molded article, especially an injection-molded article, made of the optical resin composition according to one or more embodiments of the present invention is not so high and therefore the orientation birefringence of the molded article does not become an issue when the molded article is practically used, it is not particularly necessary to take the orientation birefringence of the cross-linked structure-containing polymer into consideration when the cross-linked structure-containing polymer is designed. However when the orientation birefringence of the resulting molded article becomes an issue when the molded article is practically used, the orientation birefringence of the cross-linked structure-containing polymer needs to be made opposite in sign to the orientation birefringence of the thermoplastic resin.

The above-described technical idea is important to reduce birefringence to provide the optical resin composition and molded article according to one or more embodiments of the present invention.

The cross-linked structure-containing polymer used in one or more embodiments of the present invention shall be a polymer having a weight-average molecular weight exceeding 5000, preferably 10000 or more, more preferably 20000 or more. If the weight-average molecular weight is less than 5000, there is a fear that the physical properties, such as mechanical properties, heat resistance, and hardness, of a resulting molded article are deteriorated or the appearance of a resulting molded article is impaired due to bleeding out on the surface of the molded article during high-temperature molding processing.

It is possible to improve the mechanical strength of the optical resin composition, particularly to improve the impact resistance, because the cross-linked structure-containing polymer is a multi-layered polymer having a cross-linked polymer layer. From the viewpoint of heat resistance, the cross-linked structure-containing polymer preferably has a hard polymer layer. Such a multi-layered polymer is also referred to as a graft copolymer or a core-shell polymer, and the cross-linked structure-containing polymer used in one or more embodiments of the present invention also includes these polymers.

In U.S. Pat. No. 4,373,065, the two kinds of polymers are very different in structure, and are therefore basically less likely to be completely miscible with each other. In fact, when the two kinds of non-crosslinked polymers are blended, one of the polymers aggregates so that micron-sized domains or clearly-visible large clusters and then surface irregularities are formed, which impairs transparency or causes defects such as fish-eyes. Therefore, in order to allow two kinds of polymers to be easily completely miscible with each other, polymer design needs to be performed in consideration of two factors of birefringence control and miscibility control, which significantly reduces the degree of freedom of polymer design. Under the circumstances, the cross-linked structure-containing polymer used in one or more embodiments of the present invention exhibits its characteristics. In one or more embodiments of the present invention, when the cross-linked structure-containing polymer has a cross-linked polymer layer and a hard polymer layer and is designed so that each microparticle of the cross-linked structure-containing polymer has a submicron size, a blend of the thermoplastic resin and the cross-linked structure-containing polymer has a sea-island structure in which submicron-sized microparticles of the cross-linked structure-containing polymer are dispersed in the thermoplastic resin as a matrix, and therefore the cross-linked structure-containing polymer is less likely to endlessly aggregate to form clusters of several millimeters or centimeters that impairs transparency or causes defects such as fish-eyes. As described above, the cross-linked structure-containing polymer is previously designed to have a sub-micron size so that the dispersibility of the cross-linked structure-containing polymer in the matrix can be controlled, and therefore the cross-linked structure-containing polymer can be dispersed in the matrix even when the thermoplastic resin and the cross-linked structure-containing polymer are not completely miscible with each other. This increases the degree of freedom of polymer design of both the thermoplastic resin as a matrix and the cross-linked structure-containing polymer. For example, importance can be imposed on birefringence control when polymer design is performed. This is the second important technical idea.

Hereinbelow, the third important technical idea of one or more embodiments of the present invention will be described. There is a case where a molded article, especially an injection-molded article, made of the optical resin composition according to one or more embodiments of the present invention needs to have high heat resistance and mechanical strength such as high impact resistance. In particular, when used as optical members such as an optical lens, the molded article needs to have high heat resistance, because it is exposed to high temperature when subjected to a coating process or the like during production as well as when practically used. Further, the mechanical strength to withstand the actual use, especially impact resistance typified by the Izod strength is important. In this case, addition of the cross-linked structure-containing polymer whose cross-linked polymer layer is "soft" to the thermoplastic resin as a matrix makes it possible to significantly improve mechanical strength and achieve high heat resistance at the same time. In order to obtain such an effect, the cross-linked structure-containing polymer is preferably a multi-layered polymer (graft copolymer, core-shell polymer) having a soft cross-linked polymer layer and a hard polymer layer. Usually, addition of a soft polymer is performed as one of the ways to improve mechanical strength, but in this case, a matrix resin (in this case, the thermoplastic resin) and the soft polymer are uniformly mixed, which is disadvantageous in that a resulting molded article has low heat resistance. On the other hand, when the multi-layered polymer (graft copolymer, core-shell polymer) having a soft cross-linked polymer layer and a hard polymer layer is added, a resulting molded article has a discontinuous sea-island structure in which the soft cross-linked polymer layer is "island" and the thermoplastic resin and the hard polymer layer are "sea", and therefore it is possible to obtain an excellent effect that mechanical strength is improved and heat resistance is hardly reduced. Usually, a soft cross-linked polymer is different in composition from a matrix (thermoplastic resin), and therefore it is difficult to uniformly disperse the soft cross-linked polymer in the matrix, which deteriorates optical characteristics such as transparency or causes defects such as fish-eyes, and further becomes a factor of lowering the mechanical strength. However, in case of the multi-layered polymer having both a soft cross-linked polymer layer and a hard polymer layer, it is possible to uniformly disperse the soft cross-linked polymer in the matrix as described above.

The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

Further, the term "hard" used herein means that the glass transition temperature of the polymer is 20° C. or higher. If the glass transition temperature of the polymer is lower than 20° C., the optical resin composition and the molded article that contain the cross-linked structure-containing polymer have low heat resistance, or coarsening or agglomeration of the cross-linked structure-containing polymer is likely to occur during production of the cross-linked structure-containing polymer.

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

When a molded article that are made of the optical resin composition according to one or more embodiments of the present invention do not need to have very high mechanical strength, the cross-linked polymer layer may be either "soft" or "hard", and the definition of "soft" or "hard" is the same as that described above.

In this specification, a graft ratio is used as a parameter to express the degree of covalent bonding of the hard polymer layer to the cross-linked polymer layer in the cross-linked structure-containing polymer.

The graft ratio of the cross-linked structure-containing polymer is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most preferably 60 to 220%. If the graft ratio is less than 10%, the cross-linked structure-containing polymer is likely to agglomerate in the molded article so that there is a fear that transparency is impaired, defects are caused by foreign matter, and the mechanical strength is decreased. It is to be noted that there is a case where part of the hard polymer layer is not bonded (grafted) to the cross-linked polymer layer (also referred to as free polymer), but this free polymer is also included in the cross-linked structure-containing polymer.

(Description of Cross-Linked Polymer Layer)

Hereinbelow, the cross-linked polymer layer will be described with reference to a case where the cross-linked structure-containing polymer is a graft copolymer.

1. Description of "Soft" Cross-Linked Polymer Layer

First, the "soft" cross-linked polymer layer will be described.

The "soft" cross-linked polymer layer has the functions of (1) uniformly dispersing in the thermoplastic resin to improve mechanical strength such as crack resistance and (2) cancelling out the birefringence of the thermoplastic resin to enhance the optical isotropy of the optical resin composition and the molded article according to one or more embodiments of the present invention.

The function (1) can be achieved by polymerizing a monomer appropriately selected such that a glass transition temperature is lower than 20° C. As described above, rubber obtained by polymerizing an acrylic monomer, that is, acrylic rubber is preferred.

The function (2) will be described with reference to orientation birefringence. This time, the present inventors have found that when the optical resin composition according to one or more embodiments of the present invention is injection-molded, not only the thermoplastic resin as a matrix resin but also the above-described "soft" cross-linked polymer are oriented depending on injection conditions, mold shape, gate shape, or the like, so that orientation birefringence occurs. The frequency of occurrence of orientation birefringence of the cross-linked polymer depends not only on the polymer composition of the cross-linked polymer but also on the degree of cross-linking. When the degree of cross-linking is high, the cross-linked polymer layer is less likely to be deformed (difficult orientation) so that orientation birefringence is less likely to occur, even under molding conditions where the resin is easily oriented. On the other hand, when the degree of cross-linking is low, the cross-linked polymer is likely to be oriented depending on molding conditions so that orientation birefringence occurs. In either case, the orientation birefringence of a polymer composition constituting the cross-linked polymer needs to be taken into consideration in order to reduce the orientation birefringence of a molded article. As concrete measures, it is important to design the polymer composition of the cross-linked polymer such that the orientation birefringence of the cross-linked polymer is opposite in sign to that of the thermoplastic resin.

Next, preferred monomers used in the cross-linked polymer layer will be described.

When the thermoplastic resin as a matrix is an acrylic resin, the orientation birefringence of the cross-linked polymer needs to be positive that is opposite to the sign of the orientation birefringence of the acrylic resin, because the orientation birefringence of the acrylic resin is negative.

On the other hand, the effect of the cross-linked polymer on photoelastic birefringence will also be described. The cross-linked polymer is less likely to be deformed by the application of a certain stress, and therefore the photoelastic birefringence of the cross-linked polymer contributes less to photoelastic birefringence. When the degree of cross-linking is low, the photoelastic birefringence of the cross-linked polymer is likely to contribute to photoelastic birefringence. However, the photoelastic birefringence of the cross-linked polymer does not need to be highly considered as compared to the effect of the cross-linked polymer on orientation birefringence.

From the above points of view, the cross-linked polymer layer used in one or more embodiments of the present invention is formed by polymerizing a monomer mixture containing a monomer represented by the following general formula (4) and a polyfunctional monomer.

[Chemical Formula 15]

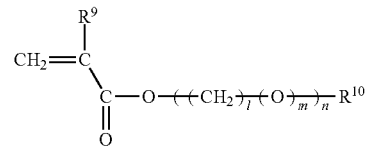

(4)

$R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), l is an integer of 1 to 4, preferably an integer of 1 or 2, m is an integer of 0 or 1, and n is an integer of 0 to 10, preferably an integer of 0 to 2, more preferably an integer of 0 or 1.

The monomer represented by the formula (4) is preferably a (meth)acrylic monomer represented by the formula (4) wherein $R^9$ is a substituted or unsubstituted alkyl group having 1 carbon atom. The (meth)acrylic monomer is more preferably one represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

The (meth)acrylic monomer is more preferably one represented by the formula (4) wherein l is an integer of 1 or 2 and n is an integer of 0 to 2.

Specific examples of the monomer having an alicyclic group include dicyclopentanyl(meth)acrylate and dicyclopentenyloxyethyl(meth)acrylate. Specific examples of the monomer having an aromatic group include benzyl(meth)acrylate, phenyl(meth)acrylate, and phenoxyethyl(meth)acrylate. Examples of the monomer having a heterocyclic structure include pentamethylpiperidinyl(meth)acrylate, tetramethylpiperidinyl(meth)acrylate, and tetrahydrofurfuryl(meth)acrylate.

Among (meth)acrylic monomers represented by the formula (4), benzyl(meth)acrylate, dicyclopentanyl(meth)acrylate, and phenoxyethyl(meth)acrylate are preferred from the viewpoint of orientation birefringence and transparency. Among monomers represented by the above formula (4), benzyl(meth)acrylate is most preferred from the viewpoint of optical isotropy, cancelling out the orientation birefringence of the thermoplastic resin to reduce orientation birefringence, and transparency. Particularly, when the heat resistance is desired to be high, benzyl methacrylate is preferred for its higher glass transition temperature. On the other hand, when the development of strength is required, benzyl acrylate is preferred for its lower glass transition temperature. For example, when the thermoplastic resin is an acrylic resin, the acrylic resin has a negative orientation birefringence, and therefore the use of benzyl methacrylate having a relatively large positive photoelastic constant has merits that the amount of benzyl methacrylate to be used can be reduced or the amount of the cross-linked structure-containing polymer to be used can be reduced and that the degree of freedom of design of the optical resin composition can be increased. When the cross-linked polymer has a low degree of cross-linking and therefore develops photoelastic birefringence, the photoelastic birefringence of the optical resin composition and the molded article can be reduced while the orientation birefringence of the optical resin composition and the molded article is also reduced, because the orientation birefringence and photoelastic birefringence of the acrylic resin are both negative whereas the orientation birefringence and photoelastic birefringence of benzyl methacrylate are both positive.

From the viewpoint of developing mechanical strength while maintaining excellent optical isotropy, the cross-linked polymer layer having, as a structural unit, the monomer represented by the formula (4) is preferably one obtained by polymerizing 1 to 100 wt % of the monomer represented by the above formula (4), 99 to 0 wt % of another monofunctional monomer copolymerizable therewith, and 0.05 to 10 parts by weight of a polyfunctional monomer (per 100 parts by weight of the total amount of the monomer represented by the above formula (4) and another monofunctional monomer copolymerizable therewith). The amount of the monomer represented by the above formula (4) to be used is preferably 1 to 100 wt %, more preferably 5 to 70 wt %, most preferably 5 to 50 wt % per 100 wt % of the total amount of the monomer represented by the above formula (4) and another monofunctional monomer copolymerizable therewith. If the amount of the polyfunctional monomer to be added is less than 0.05 part by weight, a cross-linked polymer is less likely to be formed. On the other hand, if the amount of the polyfunctional monomer to be added exceeds 10 parts by weight, there is a tendency to reduce the impact resistance of the molded article. The amount of the polyfunctional monomer to be added is preferably 0.1 to 5 parts by weight. The cross-linked polymer layer may be one obtained by one-step polymerization performed by mixing all the monomers or one obtained by polymerization performed in two or more steps by changing the composition of monomers.

In one or more embodiments of the present invention, any one of benzyl methacrylate, benzyl acrylate, dicyclopentanyl(meth)acrylate, and phenoxyethyl(meth)acrylate can be preferably used as the monomer represented by the above formula (4), and these monomers may be used singly or in combination of two or more of them. When the optical resin composition or the molded article is used in applications requiring higher heat resistance, benzyl methacrylate is more preferably used from the viewpoint of glass transition temperature.

As an example of the another monofunctional monomer copolymerizable with the monomer represented by the above formula (4), methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity and cost, the acrylic ester is preferably alkyl acrylate. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the another monofunctional copolymerizable monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylates such as methyl 2-(hydroxymethyl) acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, methacrylic ester and acrylic ester are preferred, and acrylic ester is more preferred for its low glass transition temperature and excellent mechanical strength. Particularly, n-butyl acrylate and 2-ethylhexyl acrylate are preferred, and n-butyl acrylate is most preferred. The cross-linked structure-containing polymer used in one or more embodiments of the present invention may have one or more cross-linked polymer layers different from the above-described cross-linked polymer layer.

(Description of Hard Polymer Layer)

As described above, the "hard" polymer that forms the hard polymer layer needs to have the functions of (1) uniformly dispersing the cross-linked structure-containing polymer in the matrix (thermoplastic resin) and (2) cancelling out the birefringence of the thermoplastic resin to improve the optical isotropy of the optical resin composition and the molded article according to one or more embodiments of the present invention.

The function (1) can be achieved by forming a polymer easily miscible with the matrix component by polymerization of a monomer appropriately selected.

When the injection molding is not performed under the conditions of thin molding, complex shape molding, or low temperature molding, and when the orientation birefringence is not so high in the vicinity of the gate, the function (2) can be achieved by allowing the photoelastic constant of the hard polymer to be opposite in sign to that of the matrix (thermoplastic resin) such that the molded article has a very small photoelastic constant. On the other hand, when the orientation birefringence is relatively high in the injection-molded article, the function (2) can be achieved by allowing both the photoelastic constant and orientation birefringence of the hard polymer to be opposite in sign to those of the matrix (thermoplastic resin) such that not only the photoelastic constant of the molded article but also the orientation birefringence of the molded article is very low.

What is more important to achieve the function (2) is that the "hard" polymer layer is more effective than the polymer layer having a cross-linked structure at cancelling out the birefringence of the thermoplastic resin as a matrix. Any one of more of the layers of the cross-linked structure-containing polymer, for example one or both of the cross-linked polymer layer and the hard polymer layer of the cross-linked structure-containing polymer, may have the function of cancelling out the birefringence of the thermoplastic resin, but the "hard" polymer layer is most preferred. The reason for this is considered to be that when polymer orientation occurs during molding of the matrix (thermoplastic resin) or polymer orientation occurs by the application of stress to the matrix (thermoplastic resin), the birefringence of the matrix can be cancelled out by orienting the polymer chains of the cross-linked structure-containing polymer in a direction in which the polymer chains of the matrix are oriented by external force. In this case, the polymer layer having a cross-linked structure is less likely to be deformed by external force and therefore polymer chains are less likely to be oriented, that is, the polymer layer having a cross-linked structure is less effective at cancelling out the birefringence of the matrix. Of course, when the crosslink density of the polymer layer having a cross-linked structure is low, the polymer layer having a cross-linked structure is likely to be deformed by external force, and therefore the polymer layer having a cross-linked structure is also expected to be effective to some extent at cancelling out the birefringence of the matrix. For this reason, any of the polymer layers, including the cross-linked polymer layer, of the graft copolymer may have the function of cancelling out the birefringence of the matrix, but the polymer layer other than the cross-linked polymer layer or the polymer layer in which polymer chains can be oriented by external force is preferred, and more specifically the "hard" polymer layer is preferred. The "hard" polymer layer having no cross-linked structure is more preferred, and the "hard" polymer layer that is present as an outer layer of the cross-linked structure-containing polymer so as to easily come into direct contact with the matrix and that has no cross-linked structure is even more preferred.

Hereinbelow, a description will be made with reference to a case where an outer layer of the cross-linked structure-containing polymer is the "hard" polymer layer that is highly effective at cancelling out the birefringence of the thermoplastic resin to improve the optical isotropy of the optical resin composition and the molded article according to one or more embodiments of the present invention.

A monomer species that is used for forming the hard polymer layer of the cross-linked structure-containing polymer and is suitable for cancelling out the photoelastic birefringence of the thermoplastic resin shall be selected such that the photoelastic constant of the thermoplastic resin and the photoelastic constant of the cross-linked structure-containing polymer are opposite in sign to each other.

Specific examples of a monomer are given below as a reference for setting the photoelastic constant of a polymer, but the monomer species is not limited thereto (a value within [ ] represents the photoelastic constant of a homopolymer).

Monomers Showing Positive Photoelastic Birefringence:

| | |
|---|---|
| Benzyl methacrylate | $[48.4 \times 10^{-12} \text{ Pa}^{-1}]$ |
| Dicyclopentanyl methacrylate | $[6.7 \times 10^{-12} \text{ Pa}^{-1}]$ |
| Styrene | $[10.1 \times 10^{-12} \text{ Pa}^{-1}]$ |
| Parachlorostyrene | $[29.0 \times 10^{-12} \text{ Pa}^{-1}]$ |

Monomers Showing Negative Photoelastic Birefringence:

| | |
|---|---|
| Methyl methacrylate | $[-4.3 \times 10^{-12} \text{ Pa}^{-1}]$ |
| 2,2,2-trifluoroethyl methacrylate | $[-1.7 \times 10^{-12} \text{ Pa}^{-1}]$ |
| 2,2,2-trichloroethyl methacrylate | $[-10.2 \times 10^{-12} \text{ Pa}^{-1}]$ |
| Isobornyl methacrylate | $[-5.8 \times 10^{-12} \text{ Pa}^{-1}]$ |

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence becomes substantially zero when the ratio of poly-MMA/BzMA is 92/8 (wt %). The same applies to a mixture (alloy) of two or more polymers, that is, additivity is established between the photoelastic constant of a polymer mixture and the photoelastic constants of polymers. This is why it is necessary to allow the photoelastic constant of the thermoplastic resin and the cross-linked structure-containing polymer to be opposite in sign and to adjust the amounts (wt %) of the thermoplastic resin and the cross-linked structure-containing polymer to be blended to reduce the photoelastic birefringences of the optical resin composition and the molded article according to one or more embodiments of the present invention.

Further, it is known that additivity is established between the orientation birefringence of a copolymer and the intrinsic birefringences of homopolymers corresponding to monomer species used for copolymerization. The same applies to a mixture (alloy) of two or more polymers, that is, additivity is established between the orientation birefringence of a polymer mixture and the intrinsic birefringences of polymers. The monomer species that is used for forming the hard polymer layer of the cross-linked structure-containing polymer and is suitable for cancelling out the orientation birefringence of the thermoplastic resin shall be selected such that the orientation birefringence of the thermoplastic resin and the orientation birefringence of the cross-linked structure-containing polymer are opposite in sign. Specific examples of a monomer are given below as a reference for setting the orientation birefringence of a polymer (a value within [ ] represents the intrinsic birefringence of a homopolymer consisting of the monomer), but the monomer species is not limited thereto. It is to be noted that the term "intrinsic birefringence" refers to birefringence (orientation birefringence) when a polymer is completely oriented in one direction.

Polymers Showing Positive Intrinsic Birefringence:

| | |
|---|---|
| Polybenzyl methacrylate | $[+0.002]$ |
| Polyphenylene oxide | $[+0.210]$ |
| Bisphenol A polycarbonate | $[+0.106]$ |
| Polyvinyl chloride | $[+0.027]$ |
| Polyethylene terephthalate | $[+0.105]$ |
| Polyethylene | $[+0.044]$ |

Polymers Showing Negative Intrinsic Birefringence:

| Polymethyl methacrylate | [−0.0043] |
|---|---|
| Polystyrene | [−0.100] |

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
|---|---|---|
| Polymethyl methacrylate (MMA) | Negative | Negative |
| Poly(2,2,2-trifluoroethyl methacrylate) (3FMA) | Positive | Negative |
| Polybenzyl methacrylate (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero. As shown above, when the thermoplastic resin is an acrylic resin, both the orientation birefringence and the photoelastic constant thereof are often negative, and therefore benzyl methacrylate whose orientation birefringence and photoelastic birefringence are both positive is suitable for use as the cross-linked structure-containing polymer (especially, as the hard polymer layer that is the outer layer of the cross-linked structure-containing polymer) because the orientation birefringence of the thermoplastic resin can be cancelled out while the photoelastic birefringence of the thermoplastic resin is also cancelled out.

Hereinbelow, the polymer composition of the hard polymer layer will be described in detail.

From the viewpoint of cancelling out the photoelastic birefringence and, if necessary, orientation birefringence of the thermoplastic resin as a matrix and from the viewpoint of improving mechanical strength and heat resistance and improving dispersibility of the cross-linked structure-containing polymer in the thermoplastic resin (i.e., compatibility) to reduce appearance defects such as fish-eyes, the hard polymer layer preferably contains, as a structural unit, a monomer represented by the above formula (4). The monomer represented by the above formula (4) used to form the hard polymer layer may be the same as or different from the monomer represented by the formula (4) used to form the cross-linked polymer layer.

The monomer represented by the formula (4) is preferably a (meth)acrylic monomer represented by the formula (4) wherein $R^9$ is a hydrogen atom or a substituted or unsubstituted alkyl group having 1 carbon atom. The (meth)acrylic monomer is more preferably one represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

The (meth)acrylic monomer is more preferably one represented by the formula (4) wherein l is an integer of 1 or 2 and n is an integer of 0 to 2.

Among (meth)acrylic monomers represented by the formula (4), benzyl(meth)acrylate, dicyclopentanyl(meth)acrylate, and phenoxyethyl(meth)acrylate are preferred.

Among these monomers represented by the formula (4), benzyl(meth)acrylate is most preferred in terms of optical isotropy, miscibility with the thermoplastic resin, and moldability. Further, benzyl methacrylate has a higher glass transition temperature and is therefore more preferred in terms of heat resistance. For example, when the thermoplastic resin is an acrylic resin, the thermoplastic resin has a negative photoelastic constant, and therefore the use of benzyl methacrylate having a relatively large positive photoelastic constant has merits that the amount of benzyl methacrylate to be used can be reduced or the amount of the cross-linked structure-containing polymer to be used can be reduced and that the degree of freedom of design of the optical resin composition can be increased. Although there is a case where high orientation birefringence of a molded article becomes an issue when the molded article is practically used, the orientation birefringence and photoelastic birefringence of benzyl methacrylate are both positive whereas the orientation birefringence and photoelastic birefringence of an acrylic resin are both negative, and therefore the orientation birefringence of the optical resin composition or the molded article can be reduced while the photoelastic birefringence of the optical resin composition or the molded article is also reduced.

From the viewpoint of achieving excellent dispersibility of the cross-linked structure-containing polymer to reduce appearance defects such as fish-eyes while maintaining excellent optical isotropy, the hard polymer layer having, as a structural unit, the monomer represented by the above formula (4) is preferably one obtained by polymerization of 1 to 99 wt % of the monomer represented by the above formula (4), 99 to 1 wt % of another monofunctional monomer copolymerizable therewith, and 0 to 2.0 parts by weight of a polyfunctional monomer (per 100 parts by weight of the total amount of the monomer represented by the above formula (4) and the another monofunctional monomer copolymerizable therewith). The hard polymer layer may be one obtained by one-step polymerization performed by mixing all the monomers or one obtained by polymerization performed in two or more steps by changing the composition of monomers.

In one or more embodiments of the present invention, any one of benzyl methacrylate, benzyl acrylate, dicyclopentanyl(meth)acrylate, and phenoxyethyl(meth)acrylate can be preferably used as the monomer represented by the above formula (4), and these monomers may be used singly or in combination of two or more of them. When the optical resin composition or the molded article is used in applications requiring higher heat resistance, benzyl methacrylate is more preferably used from the viewpoint of glass transition temperature.

As an example of the another monofunctional monomer copolymerizable with the monomer represented by the above formula (4), methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity and cost, the acrylic ester is preferably alkyl acrylate. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the another monofunctional copolymerizable monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylates such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Particularly, methacrylic alkyl esters and acrylic alkyl esters are preferred. From the viewpoint of compatibility with the acrylic thermoplastic resin, methyl methacrylate is preferably used. From the viewpoint of suppressing zipper depolymerization, methyl acrylate, ethyl acrylate, or n-butyl acrylate is preferably used.

The amount of the monomer represented by the above formula (4) to be used is preferably 1 to 99 wt %, more preferably 5 to 70 wt %, most preferably 5 to 50 wt % with respect to 100 wt % of the total amount of the monomer represented by the above formula (4) and the another monofunctional monomer copolymerizable therewith.

From the viewpoint of improving heat stability during molding processing, solvent resistance, and dispersibility of the cross-linked structure-containing polymer, (meth)acrylic acid and/or a salt thereof are/is preferably used. Examples of the salt of (meth)acrylic acid include sodium(meth)acrylate, calcium(meth)acrylate, magnesium(meth)acrylate, and ammonium(meth)acrylate.

When(meth)acrylic acid and/or a salt thereof are/is used, the amount of (meth)acrylic acid and/or a salt thereof contained is preferably 0.1 to 30 wt %, more preferably 0.1 to 20 wt %, even more preferably 0.1 to 15 wt %, even more preferably 0.1 to 10 wt %, most preferably 0.1 to 7 wt % per 100 wt % of the total amount of the monomer represented by the above formula (4), the (meth)acrylic acid and/or the salt thereof, and the another monofunctional monomer copolymerizable therewith.

The presence of a structure derived from(meth)acrylic acid and/or a salt thereof in the hard polymer layer makes it possible to form an acid anhydride structure due to cyclization caused by elimination of alkyl alcohol from a carboxyl group in(meth)acrylic acid and an alkyl group in a (meth)acrylic acid derivative adjacent to the (meth)acrylic acid during molding processing. For example, when methyl (meth)acrylic acid is adjacent to(meth)acrylic acid, a methanol elimination reaction occurs so that an acid anhydride structure can be formed. Further, when benzyl(meth)acrylate is adjacent to(meth)acrylic acid, a benzyl alcohol elimination reaction occurs so that an acid anhydride structure can be formed. In fact, a free acid may be dissociated even when a (meth)acrylic acid salt is present under high-temperature conditions during molding or even when a carboxyl group derived from(meth)acrylic acid may form a salt in salt solidification treatment that will be described later, and therefore the structure derived from(meth)acrylic acid and/or a salt thereof may be a free acid or may be in the form of a salt such as a magnesium salt, a calcium salt, or an ammonium salt.

The ratio at which(meth)acrylic acid is converted to an anhydride structure changes depending on heat history such as processing conditions, and all the (meth)acrylic acid structural units do not necessarily have to be converted to acid anhydride structures, and the degree of cyclization may be arbitrarily adjusted depending on desired characteristics.

It is to be noted that the hard polymer layer having, as a structural unit, a (meth)acrylate monomer represented by the above formula (4) may use a polyfunctional monomer having two or more non-conjugated reactive double bonds per molecule. Here, the polyfunctional monomer to be used may be the same as the polyfunctional monomer that can be used for the cross-linked polymer layer. From the viewpoint of optical isotropy and dispersibility, the amount of the polyfunctional monomer to be used for the hard polymer layer is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monomer represented by the above formula (4) and the another monofunctional monomer copolymerizable therewith).

The cross-linked structure-containing polymer preferably has a hard polymer layer having, as a structural unit, the monomer represented by the above formula (4) in its multi-layered structure. When the cross-linked structure-containing polymer has a hard outermost layer, the outermost layer more preferably has a hard polymer layer having, as a structural unit, the monomer represented by the above formula (4). By allowing the cross-linked structure-containing polymer to have a hard outermost layer, it is possible to allow the cross-linked structure-containing polymer to be more miscible with the acrylic thermoplastic resin, further reduce orientation birefringence and photoelastic constant, and easily obtain a molded article having excellent optical isotropy. A soft layer having a (meth)acrylic cross-linked polymer layer ((meth)acrylic rubber) may be adjacent to the inner side of the hard outermost layer.

The cross-linked structure-containing polymer may have one or more hard polymer layers different from the above-described hard polymer layer.

A preferred example of such a cross-linked structure-containing polymer is one that has a soft inner layer having a cross-linked polymer layer having, as a structural unit, the monomer represented by the above formula (4) and a hard outer layer having a hard polymer layer having, as a structural unit, the monomer represented by the above formula (4). This example is preferred from the viewpoint of productivity. Another preferred example of the cross-linked structure-containing polymer is one that has a hard inner layer composed of at least one hard polymer layer, a soft intermediate layer having a soft polymer layer composed of a cross-linked polymer layer having, as a structural unit, the monomer represented by the above formula (4), and a hard outer layer having a hard polymer layer having, as a structural unit, the monomer represented by the above formula (4). This example may further have a soft innermost layer. In one or more embodiments of the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the cross-linked structure-containing polymer has a hard layer as an innermost layer, for example, when the cross-linked structure-containing polymer has a multi-layered structure composed of a hard inner layer, a soft intermediate layer, and a hard outer layer, the innermost layer is preferably made of, for example, a hard polymer composed of 40 to 100 wt % of methacrylic ester, 0 to 60 wt % of acrylic ester, 0 to 60 wt % of an aromatic vinyl-based monomer, 0 to 10 wt % of a polyfunctional monomer, and 0 to 20 wt % of another monofunctional monomer copolymerizable with the methacrylic ester, the acrylic ester, and the aromatic vinyl-based monomer from the viewpoint of a balance between hardness and crack resistance.

When the cross-linked structure-containing polymer has a multi-layered structure composed of, for example, a soft inner layer having a cross-linked polymer layer having, as a structural unit, the monomer represented by the above formula (4) and a hard outer layer having a polymer layer having, as a structural unit, the monomer represented by the above formula (4), a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other examples of the multi-layered structure.

The volume-average particle diameter to the cross-linked polymer layer of the cross-linked structure-containing polymer is preferably 20 to 450 nm, more preferably 40 to 350 nm, even more preferably 80 to 300 nm, most preferably 80 to 250 nm. If the volume-average particle diameter is less than 20 nm, there is a case where impact resistance is deteriorated. On the other hand, if the volume-average particle diameter exceeds 450 nm, there is a case where transparency is deteriorated. It is to be noted that the volume-average particle diameter can be measured by a dynamic scattering method using, for example, MICROTRAC UPA150 (manufactured by NIKKISO CO., LTD.). More specifically, the volume-average particle diameter to the cross-linked polymer layer of the cross-linked structure-containing polymer refers to the volume-average particle diameter of particles formed from the center to the cross-linked polymer layer of particles of the cross-linked structure-containing polymer. When the cross-linked structure-containing polymer has two or more cross-linked polymer layers, the volume-average particle diameter to the cross-linked polymer layer of the cross-linked structure-containing polymer refers to a volume-average particle diameter to the cross-linked polymer layer farthest from the center of the cross-linked structure-containing polymer.

The cross-linked polymer content of the cross-linked structure-containing polymer is preferably 10 to 90 wt %, more preferably 20 to 80 wt %, even more preferably 30 to 60 wt %, most preferably 35 to 55 wt % when the amount of the cross-linked structure-containing polymer is taken as 100 wt %. If the cross-linked polymer content is less than 10 wt %, there is a case where a resulting optical resin composition has low mechanical strength such as impact resistance. On the other hand, if the cross-linked polymer content exceeds 90 wt %, the dispersibility of the cross-linked structure-containing polymer is impaired and a resulting molded article cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the cross-linked structure-containing polymer is not particularly limited, and a known emulsion polymerization method, emulsion-suspension polymerization method, suspension polymerization method, bulk polymerization method, or solution polymerization method can be used. However, the cross-linked structure-containing polymer is particularly preferably produced by an emulsion polymerization method.

The cross-linked structure-containing polymer is preferably obtained by multistep polymerization. More specifically, a graft copolymer obtained by multistep polymerization can be preferably used as the cross-linked structure-containing polymer, which is obtained by performing, as at least one of the steps of the multistep polymerization, polymerization of a monomer mixture containing the monomer represented by the above formula (4) and another monofunctional monomer copolymerizable therewith in the presence of cross-linked polymer-containing particles having, as a structural unit(s), the monomer represented by the above formula (4).

By polymerizing a monomer mixture containing the monomer represented by the above formula (4) and another monofunctional monomer copolymerizable therewith, a hard polymer having, as a structural unit, the monomer represented by the above formula (4) is formed. Examples of the another monofunctional monomer copolymerizable with the monomer represented by the above formula (4) are the same as those mentioned above, and these examples can be preferably used. The preferred content of the another monofunctional monomer copolymerizable with the monomer represented by the above formula (4) contained in the monomer mixture is the same as that described above. Examples of the polyfunctional monomer are the same as those mentioned above, and these examples can be preferably used. The amount of the polyfunctional monomer to be blended is also the same as described above.

The cross-linked polymer-containing particles having, as a structural unit, the monomer represented by the above formula (4) shall be polymer particles obtained by multistep polymerization and having a cross-linked polymer having, as a structural unit, at least the monomer represented by the above formula (4), and may further have a rubber part ((meth)acrylic cross-linked polymer) obtained by polymerizing 50 to 100 wt % of acrylic ester, 50 to 0 wt % of another monofunctional monomer copolymerizable with the acrylic ester, and 0.05 to 10 parts by weight of a polyfunctional monomer (per 100 parts by weight of the total amount of acrylic ester and/or another monofunctional monomer copolymerizable therewith). The rubber part may be obtained by one-step polymerization performed by mixing all the monomer components or by polymerization performed in two or more steps by changing the composition of monomers.

The cross-linked polymer particles having, as a structural unit, the monomer represented by the above formula (4) is not particularly limited as long as a cross-linked polymer (rubber part) having, as a structural unit, the monomer represented by the above formula (4) is formed in at least one of the steps of multistep polymerization, and polymerization for forming a hard polymer may be performed before and/or after the polymerization for forming a cross-linked polymer having, as a structural unit, the monomer represented by the above formula (4).

Particularly, from the viewpoint of productivity, the cross-linked structure-containing polymer to be used is preferably one obtained as a graft copolymer by (b-1) polymerizing a monomer mixture containing 1 to 100 wt % of the monomer represented by the above formula (4), 99 to 0 wt % of a monofunctional monomer copolymerizable therewith, and 0.05 to 10 parts by weight of a polyfunctional monomer (per 100 parts by weight of the total amount of the monomer represented by the above formula (4) and the monofunctional monomer copolymerizable therewith) to obtain(meth) acrylic rubber-containing polymer particles,
and by (b-2) polymerizing, in the presence of the crosslinked polymer-containing particles having, as a structural unit, the monomer represented by the above formula (4), a monomer mixture containing 1 to 99 wt % of the monomer represented by the above formula (4), 99 to 1 wt % of another monofunctional monomer copolymerizable therewith, and 0 to 2.0 parts by weight of a polyfunctional monomer (per 100 parts by weight of the total amount of the monomer represented by the above formula (4) and the another monofunctional monomer copolymerizable therewith). Here, the polymerization of the monomer mixture in the step (b-1) and/or the polymerization of the monomer mixture in the step (b-2) may be performed in one step by mixing all the monomer components or in two or more steps by changing the composition of monomers. Examples of the components of the monomer mixture used in the step (b-1) and preferred amounts thereof to be used are the same as those described above with reference to the cross-linked polymer layer. Examples of the components of the monomer mixture used in the step (b-2) and preferred amounts thereof to be used are the same as those described above with reference to the hard polymer layer.

The volume-average particle diameter to the cross-linked polymer layer of the cross-linked structure-containing polymer is measured in the same manner as the volume-average particle diameter to the cross-linked polymer layer of the cross-linked structure-containing polymer, and the preferred range thereof is also the same as that of the cross-linked structure-containing polymer.

When the cross-linked structure-containing polymer is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphates such as sodium polyoxyethylene lauryl ether phosphate and nonionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of a resulting cross-linked structure-containing polymer.

When the cross-linked structure-containing polymer is produced by emulsion polymerization in such a manner, a so-called latex is obtained in which primary particles of the cross-linked structure-containing polymer are emulsified and dispersed in an aqueous phase. Such a cross-linked structure-containing polymer latex often contains polymer particles or polymer blocks that are called scale and produced as a by-product in the step of multilayer polymerization for forming particles of the cross-linked structure-containing polymer particles. The polymer particles or polymer blocks have a larger particle diameter and often partially or entirely have a cross-linked structure. Further, there is a case where foreign matter containing inorganic substances or dust contained in a vapor phase or water is mixed into the latex from the outside environment in the polymerization step. Mixing of the scale or foreign matter into the optical resin composition according to one or more embodiments of the present invention is undesirable because the scale or foreign matter causes optical defects in a resulting molded article. For this reason, for the purpose of reducing or removing the scale or foreign matter, the cross-linked structure-containing polymer latex is preferably filtered through a mesh or filter. As the mesh or filter used for filtration, a widely-known one proposed for the purpose of filtering a liquid material can be used. The type, pore size, filter capacity, etc. of the mesh or filter may be appropriately selected depending on the size or desired removal rate of polymer scale produced as a by-product or foreign matter mixed into the latex as long as primary particles of the cross-linked structure-containing polymer can pass through the pores of the mesh or filter.

The cross-linked structure-containing polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered cross-linked structure-containing polymer. When the polymer latex is coagulated to obtain a cross-linked structure-containing polymer, a known coagulant such as an acid or a salt can be used, but a magnesium salt, especially magnesium sulfate, is particularly preferably used as a coagulant from the viewpoint of improving heat stability during molding of a resulting cross-linked structure-containing polymer.

The cross-linked structure-containing polymer is blended such that the amount of the cross-linked polymer layer or the cross-linked polymer-containing particles per 100 parts by weight of the optical resin composition is preferably 1 to 60 parts by weight, more preferably 1 to 30 parts by weight, even more preferably 1 to 25 parts by weight. If the amount of the cross-linked polymer layer or the cross-linked polymer-containing particles is less than 1 part by weight, there is a case where mechanical strength such as impact resistance is deteriorated or a resulting molded article has poor optical isotropy due to an increase in photoelastic constant. On the other hand, if the amount of the cross-linked polymer layer or the cross-linked polymer-containing particles exceeds 60 parts by weight, the heat resistance, surface hardness, transparency, or color tone of a resulting molded article tends to be deteriorated.

The ratio between the thermoplastic resin and the cross-linked structure-containing polymer to be blended is not particularly limited as long as the above-described requirements for blending are satisfied. Depending on the amount of the cross-linked polymer layer contained in the cross-linked structure-containing polymer, the amount of the cross-linked structure-containing polymer to be blended is preferably 1 to 99 wt %, more preferably 1 to 80 wt %, even more preferably 1 to 60 wt % when the total amount of the thermoplastic resin and the cross-linked structure-containing polymer is taken as 100 wt %. If the amount of the cross-linked structure-containing polymer to be blended is less than 1 wt %, there is a case where the mechanical strength such as impact resistance is deteriorated or a resulting molded article has poor optical isotropy due to an increase in photoelastic constant. On the other hand, if the amount of the cross-linked structure-containing polymer to be blended exceeds 99 wt %, the heat resistance, surface hardness, transparency, color tone, or surface appearance of a resulting molded article tends to deteriorated.

The optical resin composition according to one or more embodiments of the present invention may be subjected to molding, such as extrusion molding, injection molding, compression molding, blow molding, or spinning molding, on heating to form a molded article having a shape suitable for its intended use. In this case, a mixture of particulate components of the optical resin composition may be directly subjected to molding, or pellets of the optical resin composition formed by an extruder may be subjected to molding. Among these molding methods, injection molding is an excellent molding method in mass production of a member of a complex three-dimensional shape such as a lens. Injection molding allows a molten resin to flow into a mold at a high speed for shaping and quenching. However, in injection molding, both the residual orientation and the residual stress of the molded article are very large as compared to, for example, cast molding, compression molding, melt extrusion molding, or the like. Thus, it is difficult to completely remove the birefringence resulting from the residual migration or residual stress in conventional transparent resin materials, whereas the optical resin composition according to one or more embodiments of the present invention is very low in the birefringence regardless of the shape and the molding conditions and is designed to have a small difference in the refractive index between the cross-linked structure polymer and the thermoplastic resin, so that light scattering in the molded article is small and the transmitted light is colored a little in the color tone. Accordingly, it is possible to obtain an optical member having excellent transparency as well as excellent optical isotropy by the injection molding method. The injection molding is not particularly limited as long as it is a general molding method using an apparatus such as a known injection molding machine. The injection molding machine may be a horizontal type one or a vertical type one. In the injection molding, it is also possible to use a generally-known molding technique.

The molded article obtained from the optical resin composition according to one or more embodiments of the present invention is characterized by excellent transparency and has a haze of 6.0% or less when the optical resin composition is formed into an molded article having a thickness of 2 mm. The haze value of the molded article is more preferably 5.0% or less, even more preferably 4.0% or less, furthermore preferably 3.0% or less, yet even more preferably 2.0% or less, yet furthermore preferably 1.5% or less, still furthermore preferably 1.0% or less, particularly preferably 0.7% or less. When the molded article according to one or more embodiments of the present invention has a haze value within the above range, its transparency is sufficiently high and therefore the molded article is suitable for optical applications requiring transparency. In order to set the molded article to a haze of 6% or less, it is important that the difference in refractive index of between the thermoplastic resin and the cross-linked structure-containing polymer used in one or more embodiments of the present invention be reduced so that the incident light is hardly scattered. Specifically, it is preferable that the value (measured value) obtained by subtracting the refractive index of the cross-linked structure-containing polymer from the refractive index of the thermoplastic resin is in the range of −0.02 to +0.001. The upper limit is more preferably 0 or less, more preferably less than −0.001. On the other hand, the lower limit is more preferably −0.015 or more, more preferably −0.01 or more. The refractive indices of the thermoplastic resin and the cross-linked structure-containing polymer used in Examples of the present invention are summarized in Table 3. For example, the refractive index of the thermoplastic resin A1 of Example 1 is 1.4965, and the refractive index of the cross-linked structure-containing polymer B3 is 1.5048, the difference being −0.0083.

Also, the molded article according to one or more embodiments of the present invention preferably has a total light transmittance of 80% or higher, more preferably 83% or higher, even more preferably 85% or higher, yet even more preferably 88% or higher, especially preferably 90% or higher. When the molded article according to one or more embodiments of the present invention has a total light transmittance within the above range, its transparency is sufficiently high and therefore the molded article is suitable for optical applications requiring transparency.

Further, in the injection-molded article according to one or more embodiments of the present invention, the color tone of the molded article is, for example, preferably a transmitted YI (yellowness index) of 18 or less, more preferably 15 or less, furthermore preferably 10 or less, even more preferably 7 or less, yet even more preferably 4 or less, yet furthermore preferably 2 or less, especially preferably 1 or less.

The optical resin composition according to one or more embodiments of the present invention is characterized by high mechanical strength, particularly high impact resistance. In the Izod impact test which is one of impact resistance indices, the optical resin composition can exhibit an excellent impact resistance of 2.0 KJ/m$^2$ or more while keeping high transparency, color tone, and optical isotropy.

The molded article according to one or more embodiments of the present invention preferably has a glass transition temperature of 100° C. or higher, more preferably 115° C. or higher, even more preferably 120° C. or higher, yet even more preferably 124° C. or higher. When the glass transition temperature is within the above range, the molded article according to one or more embodiments of the present invention having a sufficiently high heat resistance can be obtained and is suitable for lenses, displays, and optical applications such as optical filter members requiring transparency.

From the viewpoint of obtaining a molded article from the optical resin composition according to one or more embodiments of the present invention that does not exhibit birefringence resulting from molding processing and can be practically used without issue, the value of orientation birefringence of the molded article is preferably $-1.7\times10^4$ to $1.7\times10^4$, more preferably $-1.6\times10^4$ to $1.6\times10^4$, even more preferably $-1.5\times10^4$ to $1.5\times10^4$, yet even more preferably $-1.0\times10^4$ to $1.0\times10^4$, especially preferably $-0.5\times10^4$ to $0.5\times10^4$, still especially preferably $-0.2\times10^4$ to $0.2\times10^4$, most preferably $-0.1\times10^4$ to $0.1\times10^4$.

Further, the in-plane phase difference of the molded article according to one or more embodiments of the present invention is preferably small. More specifically, the absolute value of the in-plane phase difference is preferably 10 nm or less, more preferably 6 nm or less, even more preferably 5 nm or less, yet even more preferably 3 nm or less, especially preferably 2 nm or less. Phase difference is an index value calculated based on birefringence, and in-plan phase difference (Re) can be calculated by the following formula.

$$Re=(nx-ny)\times d$$

nx and ny represent a refractive index in an X-axis direction that is an in-plane stretching direction (orientation direction of polymer chains), a refractive index in a Y-axis direction that is a direction perpendicular to the X axis, respectively; d represents a thickness of a molded article; and nx−ny represents orientation birefringence.

From the viewpoint of obtaining a molded article whose birefringence resulting from the application of stress in an environment of, for example, high temperature and high humidity is low, the photoelastic constant of the molded article from the optical resin composition according to one or more embodiments of the present invention is more preferably $-3.7\times10^{-12}$ to $3.7\times10^{-12}$, furthermore preferably $-2\times10^{-12}$ to $2\times10^{-12}$, even more preferably $-1.5\times10^{-12}$ to $1.5\times10^{-12}$, yet even more preferably $-1\times10^{-12}$ to $1\times10^{-12}$, particularly preferably $-0.5\times10^{-12}$ to $0.5\times10^{-12}$, most preferably $-0.3\times10^{-12}$ to $0.3\times10^{-12}$. When the molded article has a photoelastic constant of $-3.7\times10^{-12}$ to $3.7\times10^{-12}$ and is used even in an optical member such as a lens, optical defects such as a phase difference variation and an image focus deviation do not occur.

If necessary, the optical resin composition according to one or more embodiments of the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

Further, the optical resin composition according to one or more embodiments of the present invention shall contain at least one thermoplastic resin and at least one cross-linked structure-containing polymer, and one or more other resins may be added thereto without any particular limitation. Examples of the other resins include thermoplastic resins, multilayer polymers such as core-shell polymers and graft copolymers, and thermoplastic elastomers such as block polymers.

If necessary, the optical resin composition according to one or more embodiments of the present invention may contain a known additive or another resin. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

The injection-molded article according to one or more embodiments of the present invention can be used for various purposes listed below for its properties such as heat resistance, transparency, color tone, mechanical strength including impact resistance and optical isotropy. More specifically, the injection-molded article according to one or more embodiments of the present invention can be used for interior and exterior of cars, personal computers, mobile devices, solar batteries, and the like; photographic lenses for cameras, VTRs, and projectors; finders, filters, prisms, Fresnel lenses, and the like for use in the field of imaging; lenses such as pick-up lenses for optical disc in CD players, DVD players, MD players, lenses for common cameras, lenses for video cameras, object lenses, diffraction gratings, holograms, and collimator lenses for laser pickup, fθ lenses for laser printers, cylindrical lenses, condenser lenses or projector lenses for liquid crystal projectors, Fresnel lenses, and lenses for eyeglasses, and the like for use in the field of lenses; optical discs such as CDs, DVDs, and MDs for use in the field of optical recording; members for liquid crystal displays such as light guide plates and diffuser plates; projector screens, optical waveguides, prisms, optical fibers, optical switches, optical connectors, and the like for use in the field of optical communications; car headlights, tail lamp lenses, inner lenses, instrument covers, sunroofs, and the like for use in the field of vehicles; display-related members such as head-up displays (for example, the front plate); medical devices such as eyeglasses, contact lenses, endoscope lenses, medical supplies requiring sterilization, and the like for use in the medical field; road signs, bathroom fitments, floor materials, translucent panels for roads, lenses for double glazed glass, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc.

EXAMPLES

Hereinbelow, the present invention will be described more specifically with reference to examples, but is not limited to these examples. In the following description, "part(s)" and "%" represent "part(s) by weight" and "wt %", respectively unless otherwise specified.

(Volume-Average Particle Diameter to Cross-Linked Polymer Layer of Cross-Linked Structure-Containing Polymer)

The volume-average particle diameter to the cross-linked polymer layer of a cross-linked structure-containing polymer was measured using a cross-linked polymer particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula, a chain transfer agent was regarded as a monomer charged.

Polymerization conversion ratio (%)=[(total weight of raw materials charged×solid content−total weight of raw materials other than water•monomers)/weight of monomers charged]×100

(Graft Ratio)

Two grams of the cross-linked structure-containing polymer obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate a graft ratio by the following formula.

Graft ratio (%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.
(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 cm$^{-1}$ (Absester) and the absorption intensity of imide carbonyl groups at 1660 cm$^{-1}$ (Absimide) were determined, and the ratio between them was determined as an imidization ratio (Im % (IR)). The term "imidization ratio" used herein refers to the ratio of imide carbonyl groups to the total carbonyl groups.
(Glutarimide Unit Content)

A resin was subjected to $^1$H-NMR analysis using $^1$H-NMR BRUKER AvanceIII (400 MHz) to determine the amount of each monomer unit (mol %), such as a glutarimide unit or an ester unit, contained in the resin, and the monomer unit content (mol %) was converted to a monomer unit content (wt %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Regarding the refractive indices of a thermoplastic resin and a cross-linked structure-containing polymer, each composition was processed into a sheet, and the refractive index (nD) of the sheet was measured at the sodium D-line wavelength in accordance with JIS K7142 using an Abbe refractometer 2T manufactured by ATAGO CO., LTD.
(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC curve) was determined, and the glass transition temperature of the sample was determined from the maximum point of the DDSC curve.

(Total Light Transmittance•Haze Value)

The total light transmittance and haze value of a molded article were measured by a method specified in JIS K7105 using NDH-300A manufactured by NIPPON DENSHOKU INDUSTRIES CO., LTD.

(Transmitted YI(Yellowness Index))

A transmitted yellowness index was measured using a colorimeter (ZE-2000 manufactured by NIPPON DENSHOKU INDUSTRIES CO., LTD.) according to JIS Z8722. As a measuring object, a flat plate sample having a thickness of 2 mm manufactured by injection molding was used.

(Film Thickness)

The film thickness of a molded article was measured using a digimatic indicator (manufactured by Mitsutoyo Corporation).

(Orientation Birefringence of Molded Article)

A 15 mm×90 mm test specimen was cut out from the central portion of an injection-molded article (thickness: 2 mm, size: 15 cm×10 cm) (so that the long side 90 mm is in the longitudinal direction), and the orientation birefringence of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re of the test specimen was also measured.
(Measurement of in-Plane Phase Difference Re Will be Described in Detail Later)

(In-Plane Phase Difference Re)

A 15 mm×90 mm test specimen was cut out from an injection-molded article having a thickness of 2 mm and a size of 15 cm×10 cm (so that the long side 90 mm is in the longitudinal direction). The in-plane phase difference Re of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°.

The in-plane phase difference Re was calculated by using an automatic birefringence meter at a wavelength of 590 nm from the thickness d of the test specimen measured using a digimatic indicator (manufactured by Mitutoyo Corporation) and the refractive index n measured using an Abbe refractometer (3T manufactured by ATAGO CO., LTD.).

(Photoelastic Constant)

A strip-shaped test specimen of 15 mm×90 mm was cut out from the central portion of an injection-molded article having a thickness of 2 mm and a size of 15 cm×10 cm (so that the long side 90 mm is in the longitudinal direction). The photoelastic constant of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the molded article was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the orientation birefringence and the photoelastic constant of the cross-linked structure-containing polymer alone were measured in the following manner: the cross-linked structure-containing polymer alone was pressed at 190° C. to prepare a pressed sheet having a thickness of 500 μm, a 15 mm×90 mm test specimen was cut out from the central portion of the obtained pressed sheet, and the orientation birefringence and the photoelastic constant of the test specimen were measured in the same manner as described above.

The thermoplastic resin was injection-molded to produce an injection-molded article in the same manner as in Example 1, and the orientation birefringence and the photoelastic constant of the molded article were measured in the same manner as above.

(Impact Resistance)

According to ASTM D-256, the impact resistance was evaluated by the Izod test (temperature of 23° C., 50% humidity).

Production Example 1

Production of Glutarimide Acrylic Resin (A1)

A glutarimide acrylic resin (A1) was produced using polymethylmethacrylate as a raw material resin and monomethylamine as an imidization agent.

In this production, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by KUBOTA Corporation).

The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect pressure variation in an extruder, resin pressure meters were provided at the discharge port of the first extruder, the center of the part connecting the first and second extruders, and the discharge port of the second extruder.

In the first extruder, an imide resin intermediate 1 was produced using a polymethyl methacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (A1) was extruded through a strand die, cooled in a water tank, and pelletized by a pelletizer.

The obtained glutarimide acrylic resin (A1) is an acrylic resin (A) obtained by copolymerization of a glutarimide unit represented by the general formula (1) and a (meth)acrylic ester unit represented by the general formula (2).

The imidization ratio, glutarimide unit content, acid value, glass transition temperature, and refractive index of the glutarimide acrylic resin (A1) were measured by the above-described methods. As a result, the imidization ratio was 13%, the glutarimide unit content was 7 wt %, the acid value was 0.4 mmol/g, the glass transition temperature was 130° C., and the refractive index was 1.50. The glutarimide acrylic resin (A1) had a negative photoelastic constant.

Production Example 2

Production of Cross-Linked Structure-Containing Polymer (B1)

The following materials were fed into a polymerization apparatus having a capacity of 8 liters and equipped with a stirrer.

| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12 minutes, 24 minutes, and 36 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hour to obtain acrylic rubber particles (polymer (B-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added for 165 minutes and polymerization was further continued for 1 hour to obtain a cross-linked structure-containing polymer latex. The polymerization conversion ratio was 100.0%. The obtained latex was salted out and coagulated with magnesium sulfate, washed with water, and dried to obtain a white powder of a cross-linked structure-containing polymer (B1).

The average particle diameter of rubber particles (polymer B-1) of the cross-linked structure-containing polymer (B1) was 133 nm. The graft ratio of the cross-linked structure-containing polymer (B1) was 77%.

Production Example 3

Production of Cross-Linked Structure-Containing Polymer (B2)

The following materials were fed into a polymerization apparatus having a capacity of 8 liters and equipped with a stirrer.

| | |
|---|---|
| Deionized water | 200 part |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21 part, 0.21 part, 0.21 part, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added each time to the polymerization apparatus. After the addition, polymerization was further continued for 0.5 hour to obtain acrylic rubber particles (polymer (B-1)). The polymerization conversion ratio was 99.9%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) and then 0.2 part of sodium formaldehyde sulfoxylate were fed into the polymerization apparatus. Then, 55.309 parts of a raw material mixture of a hard polymer layer (B-2) shown in Table 2 was continuously added for 165 minutes and polymerization was further continued for 1 hour to obtain a cross-linked structure-containing polymer latex. The polymerization conversion ratio was 100.0%. The obtained latex was salted out and coagulated with magnesium sulfate, washed with water, and dried to obtain a white powder of a cross-linked structure-containing polymer (B2).

The average particle diameter of rubber particles (polymer B-1) of the cross-linked structure-containing polymer (B2) was 117 nm. The graft ratio of the cross-linked structure-containing polymer (B2) was 69%.

Production Example 4

Production of Cross-Linked Structure-Containing Polymer (B3)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21 part, 0.21 part, 0.21 part, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added each time to the polymerization apparatus. After the addition, polymerization was further continued for 1 hour to obtain acrylic rubber particles (polymer (B-1)). The polymerization conversion ratio was 99.6%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) and then 0.2 part of sodium formaldehyde sulfoxylate were fed into the polymerization apparatus. Then, 55.254 parts of a raw material mixture of a hard polymer layer (B-2) shown in Table 2 was continuously added for 165 minutes and polymerization was further continued for 1 hour to obtain a cross-linked structure-containing polymer latex. The polymerization conversion ratio was 99.6%. The obtained latex was salted out and coagulated with magnesium sulfate, washed with water, and dried to obtain a white powder of a cross-linked structure-containing polymer (B3).

The average particle diameter of rubber particles (polymer B-1) of the cross-linked structure-containing polymer (B3) was 113 nm. The graft ratio of the cross-linked structure-containing polymer (B3) was 84%.

TABLE 2

| | | Cross-linked structure-containing polymer (B) | | |
|---|---|---|---|---|
| | | B1 | B2 | B3 |
| Cross-linked polymer layer (B-1) | Content of monofunctional monomer in (B) (parts) | 45 | 45 | 45 |
| | Butyl acrylate (%) | 90 | 90 | 78 |
| | Methyl methacrylate (%) | 10 | 10 | |
| | Benzyl methacrylate (%) | | | 22 |

TABLE 2-continued

|  |  | Cross-linked structure-containing polymer (B) | | |
|---|---|---|---|---|
|  |  | B1 | B2 | B3 |
|  | Allyl methacrylate (part) | 0.225 | 0.225 | 0.225 |
|  | Cumene hydroperoxide (part) | 0.041 | 0.041 | 0.041 |
| Volume-average particle diameter of (B-1) (nm) | | 133 | 117 | 113 |
| Hard polymer layer (B-2) | Content of monofunctional monomer in (B) (parts) | 55 | 55 | 55 |
|  | Methyl methacrylate (%) | 57.8 | 46.4 | 53.1 |
|  | Butyl acrylate (%) | 4 | 4 | 4 |
|  | Benzyl methacrylate (%) | 38.2 | 44.9 | 38.2 |
|  | Methacrylic acid (%) |  | 4.7 | 4.7 |
|  | t-Dodecyl mercaptan (part) | 0 | 0.055 | — |
|  | Cumene hydroperoxide (part) | 0.254 | 0.254 | 0.254 |
| Sign of birefringence of cross-linked structure-containing polymer alone | Orientation birefringence | + | + | + |
|  | Photoelastic constant | + | + | + |

(Formation of Molded Article)

In Comparative Example 3, 100 parts by weight of A2 was used.

A2: PMMA resin SUMIPEX EX (Sumitomo Chemical Co., Ltd.)

Each of the compositions of Examples 1 and 2 and Comparative Examples 1 to 3 was kneaded in and extruded from a vent-equipped single screw extruder (HW-40-28 manufactured by TABATA Industrial Machinery Co., Ltd., 40 m/m, L/D=28) at preset temperatures of C1 to C3 of 210° C., a preset temperature of C4 of 220° C., a preset temperature of C5 of 230° C., and a preset temperature of D of 240° C. and pelletized to obtain pellets. The obtained pellets were dried at 90° C. for 3 hours or longer and then subjected to injection molding using an injection molding machine (Model 160MSP-10 manufactured by Mitsubishi Heavy Industries Ltd.) at a cylinder temperature T3 of 250° C., a cylinder temperature T2 of 250° C., a cylinder temperature T1 of 260° C., a nozzle temperature N of 260° C., an injection rate of 19.7%, and a mold temperature of 60° C. to obtain a flat plate sample having a thickness of 2 mm and a size of 15 cm×10 cm. The total light transmittance, haze, and transmitted YI of the obtained flat plate sample were measured as indicators of transparency.

Further, ¼-inch test pieces were prepared at the same injection molding temperature to evaluate impact resistance. The results are shown in Table 3

TABLE 3

|  |  |  |  | Example | | Comparative Example | | |
|---|---|---|---|---|---|---|---|---|
|  |  |  |  | 1 | 2 | 1 | 2 | 3 |
| Thermoplastic resin (A) | | | Type | A1 | A1 | A1 | A2 | A1 |
|  | | | (parts) | 59 | 65 | 53 | 100 | 100 |
| Cross-linked structure-containing polymer (B) | | | Type | B3 | B2 | B1 | — | — |
|  | | | (parts) | 41 | 35 | 47 | — | — |
| Injection properties | Thickness | | (mm) | 2 | 2 | 2 | 2 | 2 |
|  | Glass transition temperature | | (° C.) | 123 | 123 | 121 | 108 | 125 |
|  | Total light transmittance | | (%) | 90.3 | 83.1 | 82.9 | 92.3 | 91.7 |
|  | Haze value | | (%) | 1.4 | 5.6 | 7.0 | 0.6 | 0.4 |
|  | Transmitted YI | | | 6.8 | 18.0 | 18.0 | 0.8 | 2.0 |
|  | Impact resistance | Izod test (¼-inch bar) | kJ/m$^2$ | 2.5 | 2.5 | 4.3 | 1.8 | 1.2 |
|  | Flat plate | Orientation birefringence | (×10$^{-4}$) | ±0.00 | ±0.05 | ±0.06 | −0.30 | ±0.01 |
|  |  | Re | nm | 0.9 | 9.7 | 12.3 | −60.0 | 1.2 |
|  |  | Photoelastic constant (×10$^{-12}$) | (Pa$^{-1}$) | 0.00 | 0.00 | −0.09 | −3.84 | −4.38 |
|  |  | Orientation birefringence Crossed-Nicols test Presence or absence of light leakage | | Absent | Slightly present | Slightly present | Present | Absent |
|  | Refractive index | Thermoplastic resin (A) | | 1.4965 | 1.4965 | 1.4965 | 1.4909 | 1.4965 |
|  |  | Cross-linked structure polymer (B) | | 1.5048 | 1.4975 | 1.4951 | — | — |
|  |  | (A) − (B) | | −0.0083 | −0.0010 | 0.0014 | | |

It can be seen that the flat plate samples obtained in Examples 1 and 2 have excellent impact resistance and small photoelastic constants as compared to those obtained in Comparative Examples 3 and 4. Further, it can be seen that the flat plate sample of Example 1 has small orientation birefringence and excellent transparency because of its low haze as compared to the flat plate samples of Comparative Examples 1 and 2.

Further, in order to compare phase differences (Re) in all of the obtained flat plate samples, a crossed Nicols test was performed, in which each of the flat plate samples (2 mm in thickness, 15 cm×10 cm in size) was placed between two polarizing plates orthogonal to each other to determine whether transmitted light was observed (presence or absence of light leakage). FIGS. 1 to 5 are photographs showing the results of the crossed Nicols test for Examples 1 and 2 and Comparative Examples 1 to 3, respectively. In general, when a resin is injection-molded, the resin is likely to be oriented particularly in the vicinity of a gate so that light leakage resulting from orientation birefringence is likely to occur (Comparative Example 2, FIG. 4).

On the other hand, as shown in FIG. 1, such light leakage was hardly observed in the case of the flat plate sample made of the optical resin composition according to the present invention (Example 1). Also in the case of Comparative Example 3, light leakage resulting from orientation birefringence did not occur, but as can be seen from Table 3, the flat plate sample of Example 1 is much lower in photoelastic birefringence (constant) than and much superior in impact resistance to that of Comparative Example 3. That is, the optical resin composition according to the present invention is suitable as a material of an injection-molded article for optical use, such as a lens, a pick-up lens, a lens array, a display material such as head-up display, required to have very high optical isotropy. Also the optical resin composition according to the present invention is suitable for optical applications where impact resistance is required.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical resin composition comprising:
a thermoplastic resin and a cross-linked structure-containing polymer,
wherein the thermoplastic resin is an acrylic thermoplastic resin,
wherein a photoelastic constant of the cross-linked structure-containing polymer and a photoelastic constant of the thermoplastic resin are opposite in sign,
wherein a molded article with a thickness of 2 mm formed from the optical resin composition has a haze of 3.0% or less,
wherein the cross-linked structure-containing polymer comprises acrylic resin particles having a cross-linked polymer layer and a hard polymer layer, and wherein the cross-linked structure-containing polymer has a cross-linked polymer containing as a structural unit a monomer represented by the following general formula (4) in the cross-linked structure:

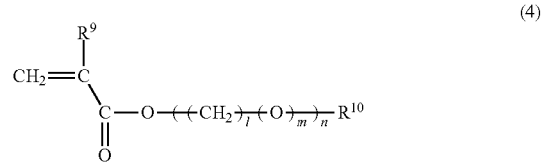

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10.

2. The optical resin composition according to claim 1, wherein the cross-linked structure-containing polymer has a portion made of a hard polymer.

3. The optical resin composition according to claim 1, wherein the cross-linked structure-containing polymer has a hard polymer containing as a structural unit a vinyl-based monomer having an alicyclic structure, a heterocyclic structure, or an aromatic group.

4. The optical resin composition according to claim 1, wherein the cross-linked structure-containing polymer has a hard polymer containing as a structural unit a monomer represented by the following general formula (4):

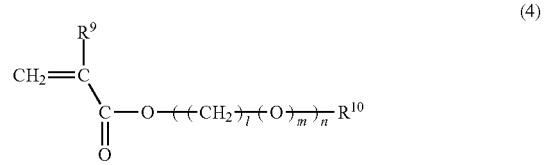

(4)

wherein $R^9$ represents a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a homocyclic structure or a heterocyclic structure; l is an integer of 1 to 4; m is an integer of 0 to 1; and n is an integer of 0 to 10.

5. The optical resin composition according to claim 1, wherein an orientation birefringence of the thermoplastic resin and an orientation birefringence of the cross-linked structure-containing polymer are opposite in sign.

6. The optical resin composition according to claim 1, wherein the monomer represented by the general formula (4) is at least one selected from the group consisting of benzyl (meth)acrylate, dicyclopentanyl(meth)acrylate, and phenoxyethyl(meth)acrylate.

7. The optical resin composition according to claim 1, wherein the thermoplastic resin contains at least one selected from the group consisting of a maleimide acrylic resin, a glutarimide acrylic resin, a lactone ring-containing acrylic polymer, a partially hydrogenated styrene-based polymer obtained by partially hydrogenating an aromatic ring of a styrene-based polymer obtained by polymerizing a styrene monomer and another monomer copolymerizable therewith, an acrylic polymer containing a cyclic acid anhydride repeating unit, and an acrylic polymer containing a hydroxyl group and/or carboxyl group.

8. The optical resin composition according to claim 1, wherein the thermoplastic resin contains a maleimide acrylic resin having a maleimide unit represented by the following general formula (5) and a (meth)acrylic ester unit:

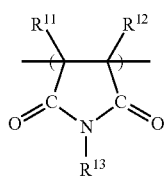

(5)

wherein $R^{11}$ and $R^{12}$ are each independently a hydrogen atom, an alkyl group having 1 to 12 carbon atoms, or an aryl group having 6 to 14 carbon atoms; $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following: a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

9. The optical resin composition according to claim 8, wherein the maleimide acrylic resin further contains a unit represented by the following general formula (3):

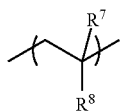

(3)

wherein $R^7$ is hydrogen or an alkyl group having 1 to 8 carbon atoms, and $R^8$ is an aryl group having 6 to 10 carbon atoms.

10. The optical resin composition according to claim 1, wherein the thermoplastic resin contains a glutarimide acrylic resin having a unit represented by the following general formula (1):

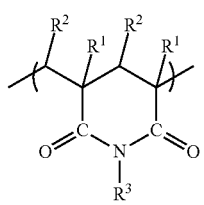

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms; and a unit represented by the following general formula (2):

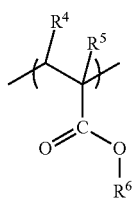

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent having 5 to 15 carbon atoms.

11. The optical resin composition according to claim 1, wherein a content of the cross-linked structure contained in the cross-linked structure-containing polymer, a content of the cross-linked polymer-containing particles contained in the multistep polymer, or a content of the cross-linked polymer layer contained in the multi-layered polymer is 1 to 60 parts by weight per 100 parts by weight of the optical resin composition.

12. The optical resin composition according to claim 4, wherein the hard polymer comprises the monomer represented by the general formula (4) in an amount of 44.9 to 99 wt %.

13. The optical resin composition according to claim 4, wherein the cross-linked structure-containing polymer further comprises a cross-linked polymer containing, as a structural unit, a monomer represented by the general formula (4), and
    wherein the hard polymer comprises the monomer represented by the general formula (4) in an amount of 38.2 to 99 wt %.

* * * * *